United States Patent
Tojo

(10) Patent No.: US 7,623,259 B2
(45) Date of Patent: Nov. 24, 2009

(54) IMAGE PROCESSING APPARATUS AND IMAGE PROCESSING METHOD TO STORE IMAGE DATA FOR SUBSEQUENT RETRIEVAL

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 11/223,986

(22) Filed: Sep. 13, 2005

(65) Prior Publication Data

US 2006/0056660 A1    Mar. 16, 2006

(30) Foreign Application Priority Data

Sep. 14, 2004  (JP)  ............... 2004-267518

(51) Int. Cl.
*G06F 3/12*   (2006.01)
(52) U.S. Cl. .............. 358/1.15; 358/1.16; 382/112
(58) Field of Classification Search ............ 707/104.1; 382/181, 112; 358/1.15, 1.16, 488; 399/19, 399/75, 83, 367
See application file for complete search history.

(56) References Cited

U.S. PATENT DOCUMENTS

| | | | | |
|---|---|---|---|---|
| 4,985,863 A | | 1/1991 | Fujisawa et al. ............ 364/900 |
| 6,111,667 A | * | 8/2000 | Mishima et al. ............ 358/488 |
| 6,226,636 B1 | * | 5/2001 | Abdel-Mottaleb et al. ...................... 707/104.1 |
| 6,502,105 B1 | * | 12/2002 | Yan et al. ................. 707/104.1 |
| 7,283,267 B2 | * | 10/2007 | Mitsubori et al. .......... 358/1.15 |
| 7,308,155 B2 | | 12/2007 | Terada ........................ 382/284 |
| 7,339,695 B2 | | 3/2008 | Mitsubori .................. 358/1.15 |
| 7,349,577 B2 | | 3/2008 | Kaneda et al. .............. 382/190 |
| 2002/0048403 A1 | * | 4/2002 | Guerreri ..................... 382/181 |
| 2004/0247206 A1 | | 12/2004 | Kaneda et al. ............. 382/305 |

FOREIGN PATENT DOCUMENTS

| | | |
|---|---|---|
| JP | 07-097373 B | 10/1995 |
| JP | 07-098373 B | 10/1995 |
| JP | 11-187253 | 7/1999 |
| JP | 2000-175008 | 6/2000 |
| JP | 2000-261648 | 9/2000 |
| JP | 2001-257862 A | 9/2001 |
| JP | 2003-6078 | 1/2003 |
| JP | 2003-32428 | 1/2003 |
| JP | 2003032428 A * | 1/2003 |
| JP | 2003-163801 | 6/2003 |
| JP | 2004-252843 | 9/2004 |

OTHER PUBLICATIONS

Japanese Office Action dated Jan. 9, 2009, regarding Application No. 2004-267518.

* cited by examiner

*Primary Examiner*—Twyler L Haskins
*Assistant Examiner*—Nicholas C Pachol
(74) *Attorney, Agent, or Firm*—Fitzpatrick, Cella, Harper & Scinto

(57) ABSTRACT

From an already registered image data group, image data similar to image data input as a query are retrieved (S3190). When image quality of one of the retrieved image data is lower than that of the input image data, the input image data is registered in place of the one image data (S3163).

7 Claims, 27 Drawing Sheets

FIG. 4

| DOCUMENT ID | PAGE NUMBER | IMAGE QUALITY INFORMATION | ADDRESS |
|---|---|---|---|
| 0000001 | 1 | 2 in 1, COLOR, A4, RECYCLED PAPER | ¥¥abc¥doc¥ship_p1.bmp |
| 0000001 | 2 | 2 in 1, COLOR, A4, RECYCLED PAPER | ¥¥abc¥doc¥ship_p2.bmp |
| 0000002 | 1 | 1 in 1, GRAY, B4, HIGH-QUALITY PAPER | C:¥img¥car_p1.bmp |
| 0000002 | 2 | 1 in 1, GRAY, B4, HIGH-QUALITY PAPER | C:¥img¥car_p2.bmp |

FIG. 5

| DOCUMENT ID | PAGE NUMBER | BLOCK ID | ATTRIBUTE | SIZE | POSITION |
|---|---|---|---|---|---|
| 0000001 | 1 | 0001 | IMAGE | 30×30 | 5, 5 |
| 0000001 | 1 | 0002 | IMAGE | 40×40 | 5, 50 |
| 0000001 | 1 | 0003 | TEXT | 30×30 | 80, 5 |
| 0000001 | 2 | 0001 | TEXT | 40×40 | 5, 5 |
| 0000001 | 2 | 0002 | IMAGE | 60×60 | 5, 45 |
| 0000002 | 1 | 0001 | IMAGE | 30×30 | 15, 5 |
| 0000002 | 1 | 0002 | IMAGE | 35×35 | 15, 50 |
| 0000002 | 1 | 0003 | TEXT | 35×35 | 75, 5 |

FIG. 6

| DOCUMENT ID | PAGE NUMBER | BLOCK ID | COLOR FEATURE AMOUNT |
|---|---|---|---|
| 0000001 | 1 | 0001 | · · · · · |
| 0000001 | 1 | 0002 | · · · · · |
| 0000001 | 2 | 0002 | · · · · · |
| 0000002 | 1 | 0001 | · · · · · |
| 0000002 | 1 | 0002 | · · · · · |

FIG. 7

| DOCUMENT ID | PAGE NUMBER | BLOCK ID | TEXT FEATURE AMOUNT |
|---|---|---|---|
| 0000001 | 1 | 0003 | · · · · · |
| 0000001 | 2 | 0001 | · · · · · |
| 0000002 | 1 | 0003 | · · · · · |

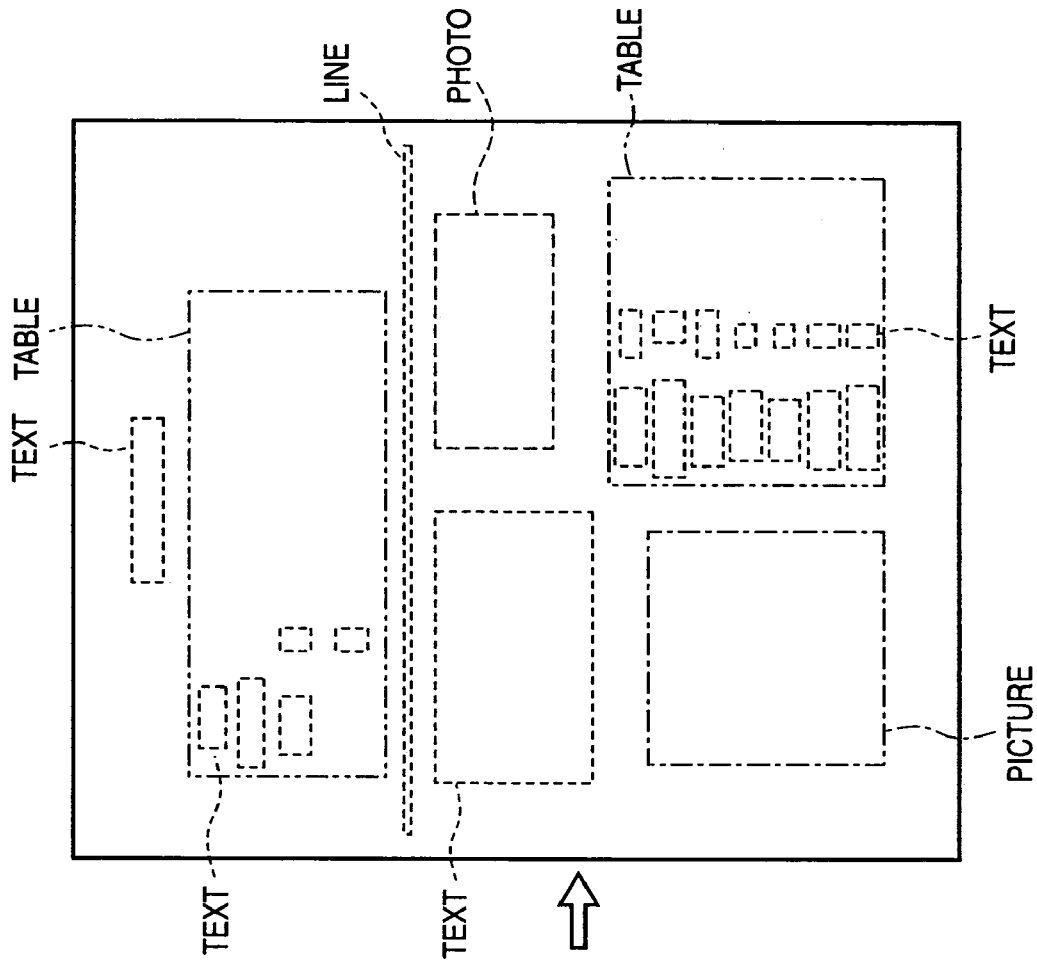
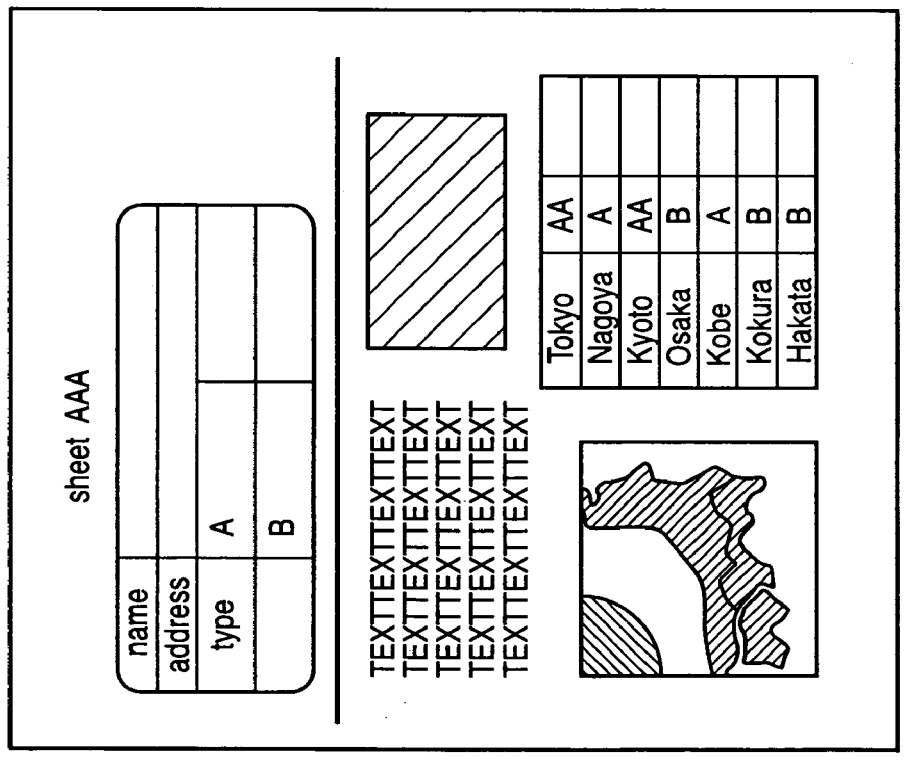
FIG. 9A / FIG. 9B

FIG. 18

|   | 1 | 2 | 3 | 4 | 5 | 6 | 7 | 8 | ... |
|---|---|---|---|---|---|---|---|---|-----|
| 1 | 0 | 1 | 1 | 5 | 1 | 5 | 7 | 7 | ... |
| 2 |   | 0 | 2 | 1 | 1 | 7 | 2 | 5 | ... |
| 3 |   |   | 0 | 7 | 1 | 1 | 5 | 2 | ... |
| 4 |   |   |   | 0 | 1 | 9 | 1 | 7 | ... |
| ⋮ |   |   |   |   |   |   |   |   |     |

IMAGE PROCESSING APPARATUS AND IMAGE PROCESSING METHOD TO STORE IMAGE DATA FOR SUBSEQUENT RETRIEVAL

FIELD OF THE INVENTION

The present invention relates to a technique for managing images.

BACKGROUND OF THE INVENTION

In recent years, in order to improve the re-usability of created paper documents, a system which manages paper documents as digital data by scanning them using a scanner, and then allows the user to either retrieve digital data of a desired document, or to print the retrieved digital data, and so forth, has been proposed.

As a method to implement such a system, for example, patent reference 1 (Japanese Patent Publication (Kokoku) No. 07-097373 (corresponding to U.S. Pat. No. 4,985,863) discloses the following technique. A scan image (digital data) obtained by scanning a paper document undergoes character recognition to obtain a character code string, which is stored as an identifier with the digital data. When a character code string included in the document is input as a retrieval condition, the digital data is retrieved based on the stored identifier.

Also, for example, patent reference 2 (Japanese Patent Laid-Open No. 2001-257862) discloses the following technique. Upon converting a paper document into digital data, an identification code is assigned to that digital data to generate a print including that identification code. Thus, when digital data corresponding to the print is to be retrieved or printed, that print is scanned in order to recognize the printed identification code. This allows the retrieval or printing of desired digital data.

However, with the techniques disclosed in the above patent references 1 and 2, since a paper document is converted into digital data at the time of registration only, the following problems occur.

Since a paper document is normally distributed after, e.g., it has been copied, documents having identical contents and various image qualities are often distributed and presented. This is especially true, for paper documents created in past years, where the location of the master copy of that paper document becomes unknown. In such case, the image processing system must be used with the distributed paper document.

Since usually such a document is distributed for reference purposes, its image quality is unweighted, and it is often repetitively copied. When such document is directly printed from a printer or the like, it is often printed in gray-scale even if it is a color document. Furthermore, N pages (e.g., two pages, four pages, and the like) of a single document are often printed on a single sheet (to be referred to as N-page print hereinafter).

When pages of a plurality of documents must be referred to at the same time, they may be printed after integration (to be referred to as integrated print hereinafter).

Furthermore, in order to fold in two and to bind printed sheets, page numbers may be printed in the order upon bookbinding (to be referred to as booklet print hereinafter).

Note that a print mode that lays out and prints N pages of a document per sheet (such as N-page print, integrated print, booklet print, and the like) will be generically named as Nup print hereinafter. When such Nup print is performed, the resolution per page is low, and the overall image quality is poor.

When a paper document with low image quality is registered, the following problems occur.

For example, with the technique disclosed in patent reference 1, character recognition errors readily occur, and as the number of registered documents increases, documents become hardly distinguishable from other documents. Hence, a large number of retrieval result candidates are undesirably obtained, and the user must narrow down these candidates.

Also, for example, with the technique disclosed in patent reference 2, since image quality upon printing depends on that of a document upon registration, a print with higher image quality cannot be realized even if desired.

In order to solve the above problems, registration must be performed after all paper documents to be registered, which have high image quality, are prepared. However, the image processing system cannot be used until such paper documents with high image quality are prepared. Thus, as another solution, every time a paper document with higher image quality is found, it is re-registered for all documents. Unfortunately, this method is more cumbersome for a user.

SUMMARY OF THE INVENTION

The present invention has been made in consideration of the aforementioned problems, and has as its object to provide a technique for updating digital data of a document to be registered to that with higher image quality accordingly.

In order to achieve an object of the present invention, for example, an image processing apparatus of the present invention comprises the following arrangement.

That is, an image processing apparatus for managing image data, comprising:

holding means for holding at least one image data;

input means for inputting image data as a query;

retrieval means for retrieving image data similar to the image data input by the input means from an image data group held by the holding means;

comparison means for comparing image quality of the image data retrieved by the retrieval means, and image quality of the image data input by the input means; and storage control means for, when the image quality of the image data input by the input means is higher than the image quality of the retrieved image data, storing the image data input by the input means in the holding means as the retrieved image data.

In order to achieve an object of the present invention, for example, an image processing method of the present invention comprises the following arrangement.

That is, an image processing method to be executed by an image processing apparatus which has a memory for holding one or more image data, comprising:

an input step of inputting image data as a query;

a retrieval step of retrieving image data similar to the image data input in the input step from an image data group held in the memory;

a comparison step of comparing image quality of the image data retrieved in the retrieval step, and image quality of the image data input in the input step; and a storage control step of storing, when the image quality of the image data input in the input step is higher than the image quality of the retrieved image data, the image data input in the input step in the memory as the retrieved image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows an example of the configuration of document management information;

FIG. 5 shows an example of the configuration of block information;

FIG. 6 shows an example of the configuration of a table used to manage feature amounts extracted from image blocks;

FIG. 7 shows an example of the configuration of a table used to manage feature amounts extracted from text blocks;

FIGS. 9A and 9B are views for explaining block selection processing;

FIG. 18 shows an example of the configuration of a color bin penalty matrix used in the first embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1:
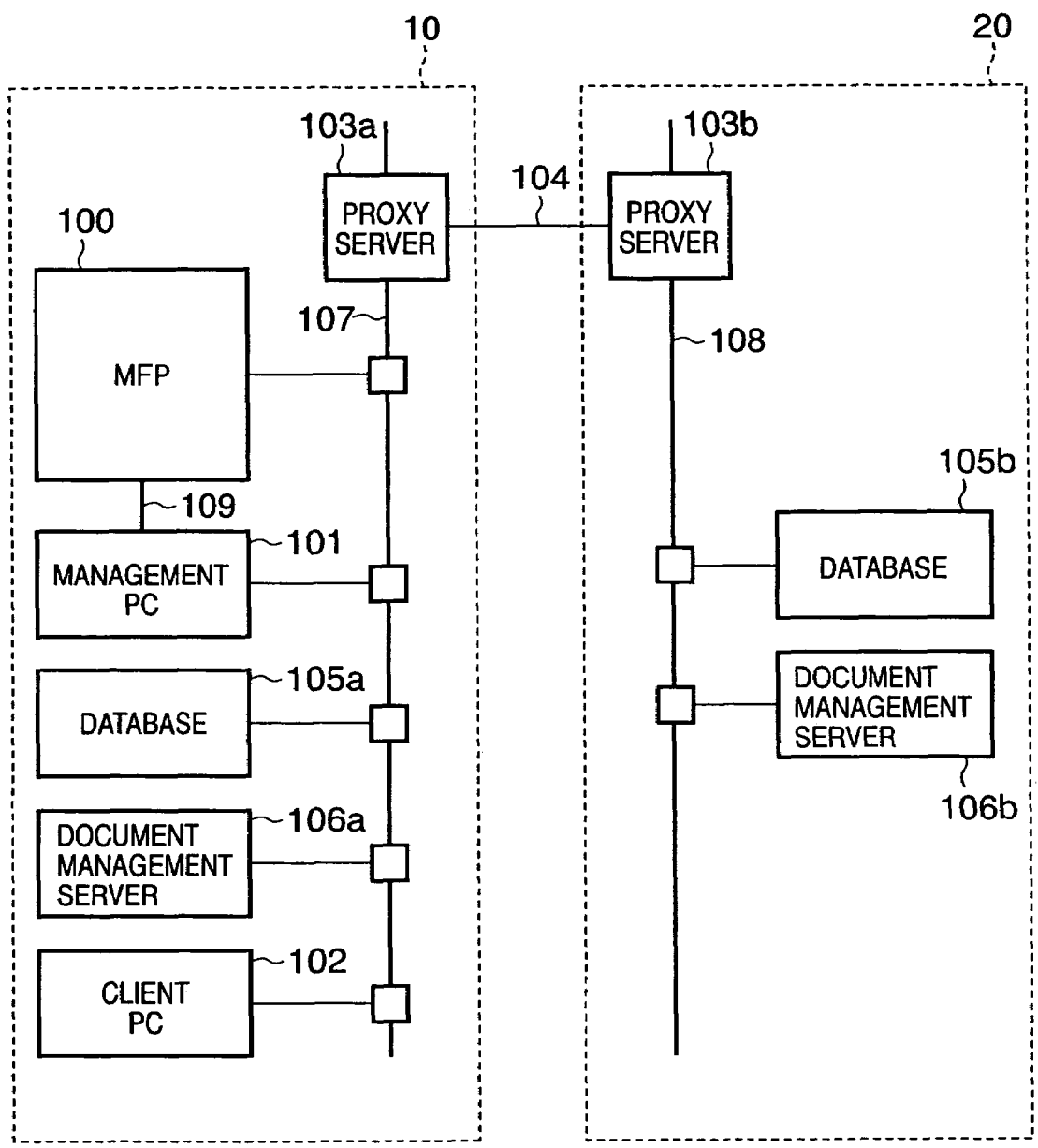
FIG. 1 is a block diagram showing an example of the arrangement of an image processing system according to the first embodiment of the present invention.

FIG. 1 is a block diagram showing an example of the arrangement of an image processing system according to this embodiment.

An image processing system with the arrangement shown in FIG. 1 is implemented in an environment in which offices 10 and 20 are connected via a network 104 such as the Internet or the like.

To a LAN 107 formed in the office 10, an MFP (Multi Function Peripheral) 100 which implements a plurality of different functions, a management PC 101 for controlling the MFP 100, a client PC 102, a document management server 106a, its database 105a, and a proxy server 103a are connected.

The LAN 107 in the office 10 and a LAN 108 in the office 20 are connected to the network 104 via the proxy server 103a and a proxy server 103b in the respective offices.

The MFP 100 especially has an image scanning unit for digitally scanning a paper document, and an image processing unit for applying image processing to an image signal obtained from the image scanning unit. The image signal can be transmitted to the management PC 101 via a LAN 109.

The management PC 101 is a normal PC (personal computer), and includes various components such as an image storage unit, image processing unit, display unit, input unit, and the like. Some of these components are integrated with the MFP 100.

Note that the network 104 is typically a communication network which is implemented by any of the Internet, LAN, WAN, or telephone line, dedicated digital line, ATM or frame relay line, communication satellite line, cable TV line, data broadcast wireless line, and the like, or a combination of them, and need only exchange data.

Each of terminals such as the management PC 101, client PC 102, and document management servers 106a and 106b, and the like has standard components (e.g., a CPU, RAM, ROM, hard disk, external storage device, network interface, display, keyboard, mouse, and the like) arranged in a general-purpose computer.

The MFP 100 will be described below.

Figure 2:
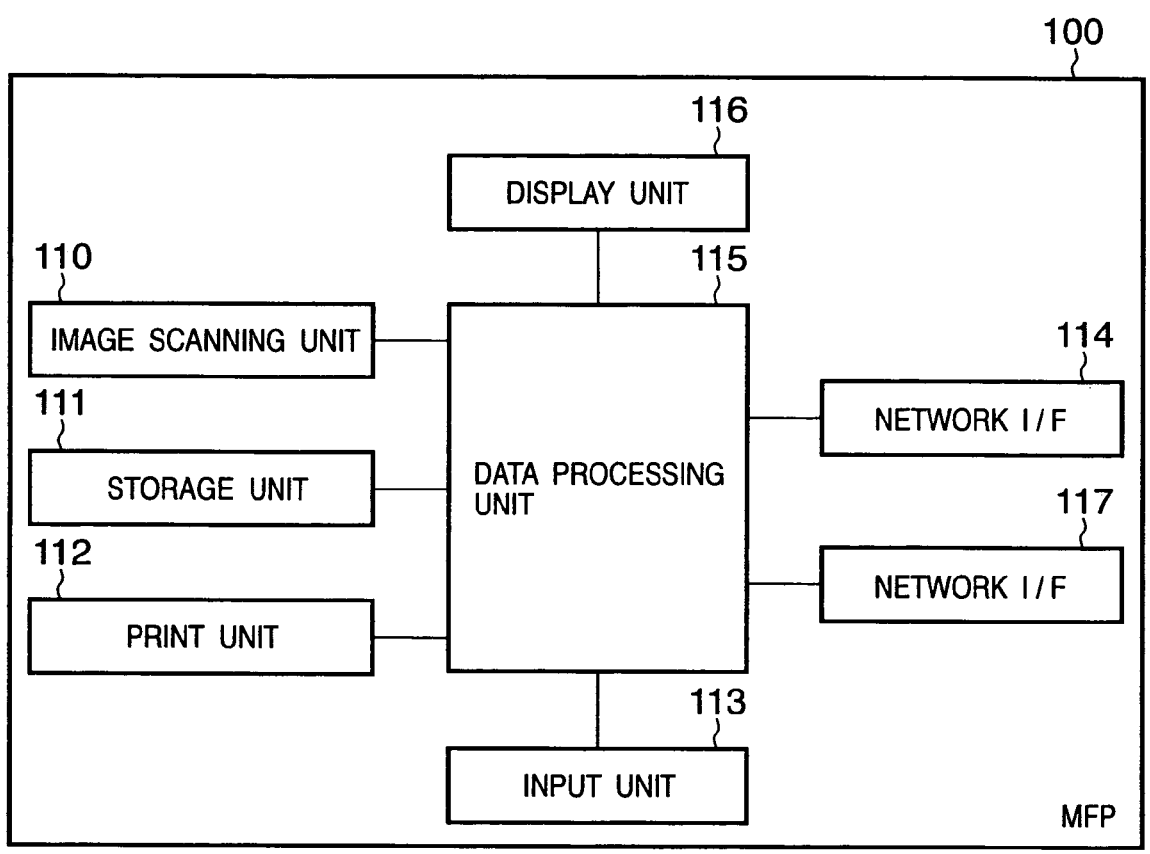
FIG. 2 is a block diagram showing the functional arrangement of an MFP 100.

FIG. 2 is a block diagram showing the functional arrangement of the MFP 100.

An image scanning unit 110 including a document table and auto document feeder (ADF) irradiates a document image on each of one or a plurality of stacked documents with light coming from a light source (not shown), forms an image of light reflected by the document on a solid-state image sensing element via a lens, and obtains a scanned image signal in the raster order as a raster image of a predetermined density (e.g., 600 DPI) from the solid-state image sensing element. This raster image is an image scanned from each document.

The MFP 100 has a copy function of printing an image corresponding to the scanned image signal on a print medium by a print unit 112. When one copy of a document is to be generated, the scanned image signal undergoes image processing by a data processing unit 115 to generate a print signal, which is output to the print unit 112. The print unit 112 forms (prints) an image according to this print signal on a print medium. When copies of a plurality of documents are to be generated, print signals of respective pages are temporarily stored and held in a storage unit 111, and are sequentially output to the print unit 112. The print unit 112 forms (prints) images according to the print signals for respective pages on print media.

On the other hand, a print signal output from the client PC 102 is received by the data processing unit 115 via the LAN 107 and a network I/F 114. The data processing unit 115 converts the print signal into raster data that can be printed by the print unit 112, and then controls the print unit 112 to print the raster data on a print medium.

An operator's instruction to the MFP 100 is issued using a key operation unit equipped on the MFP 100 and an input unit 113 which is connected to the management PC 101 and includes a keyboard and mouse, and a series of operations of these units are controlled by a controller (not shown) in the data processing unit 115. The status of operation inputs and image data which is being processed are displayed on a display unit 116.

The storage unit 111 is controlled by the management PC 101, and data exchange and control between the MFP 100 and management PC 101 are done via a network I/F 117 and the LAN 109.

Note that the MFP 100 implements a user interface that presents various operations and displays required to execute various processes to be described later to the user using the display unit 116 and input unit 113.

In the following description, the processing to be executed by the MFP 100 upon registering an image in the storage unit 111 of the MFP 100, and the processing to be executed by the MFP 100 upon retrieving an image, which is most similar to an image input as a query, of those which are registered in the storage unit 111 of the MFP 100 will be explained.

<Registration Processing>

Figure 3A:
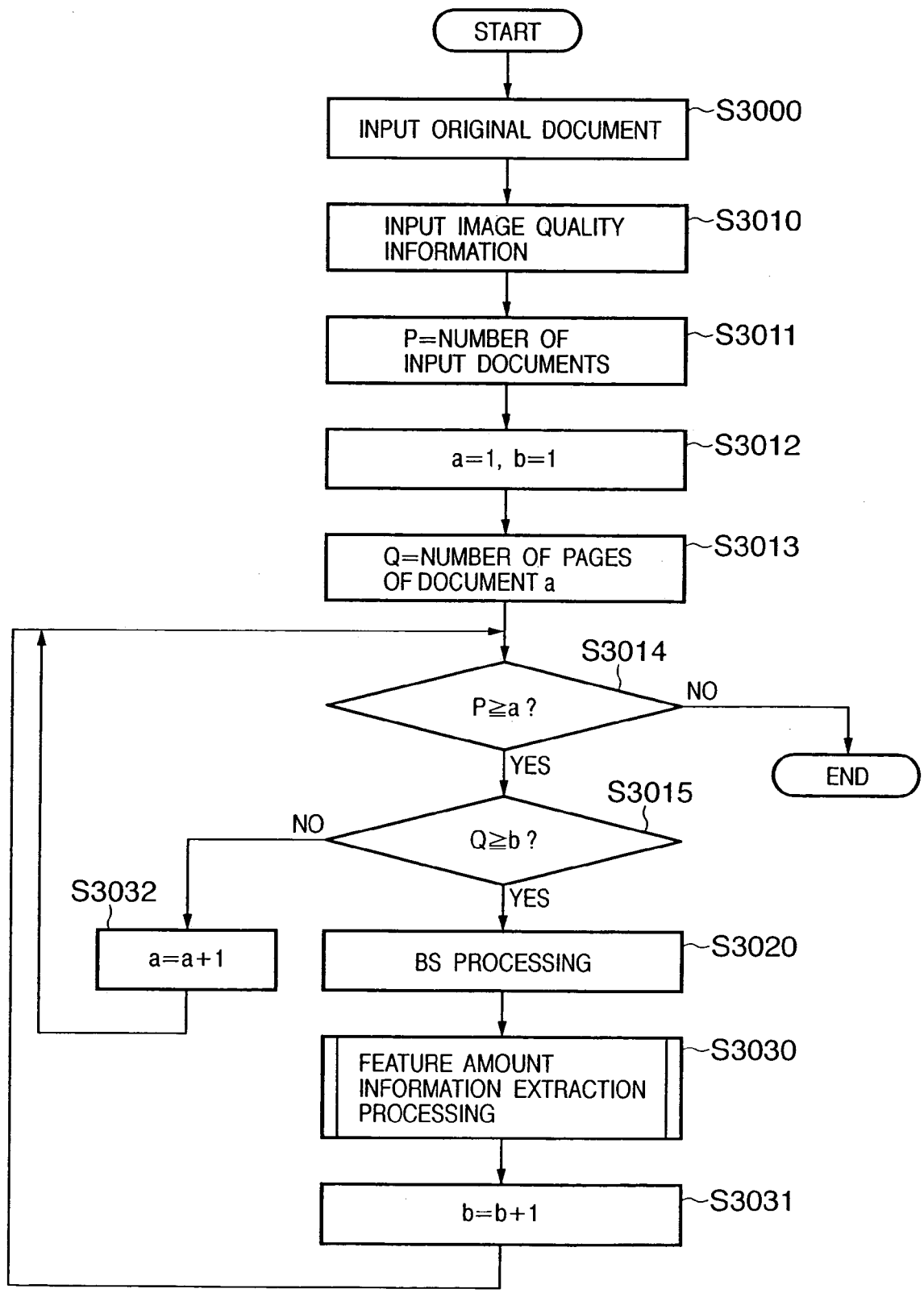
FIG. 3A is a flowchart showing a series of processes for scanning a paper document to read information printed on this paper document as image data, and registering the read image in a storage unit 111 of the MFP 100.

FIG. 3A is a flowchart showing a series of processes for scanning a paper document to read information printed on this paper document as image data, and registering the read image in the storage unit 111 of the MFP 100.

Note that the processing according to the flowchart of FIG. 3A is started when a paper document to be scanned is set on the ADF of the image scanning unit 110, and a registration button on the input unit 113 is pressed. A plurality of paper documents may be set.

Since the operator inputs the number of documents to be input and the number of pages of each document using the input unit 113, these pieces of input information are temporarily stored in the storage unit 111 in step S3000. By obtaining such information, the relationship between an image obtained by scanning, and a document and its page can be specified.

After the storage unit 111 stores the information indicating "the number of documents to be input" and "the number of pages of each document", the image scanning unit 110 scans a paper document and reads information printed on this paper document as an image (original document). The read image data is corrected by image processing such as gamma correction and the like by the data processing unit 115. The corrected image data is temporarily stored in the storage unit 111 as a file. When the paper document to be scanned includes a plurality of pages, image data read from respective pages are stored in the storage unit 111 as independent files.

In some cases, a plurality of pages may be printed on a sheet of paper document (the Nup print). In such case, the data processing unit 115 specifies print regions of respective pages from image data of a sheet of paper document obtained from the image scanning unit 110 by a known technique, enlarges images in the respective specified regions to the original size of a sheet of paper document, and then stores them in the storage unit 111. That is, when N pages are printed in a sheet of paper document, N images (scan images for N pages) are stored in the storage unit 111.

Upon storing an image in the storage unit 111, an ID unique to each document is issued, and is stored in the storage unit 111 as document management information as a set of the storage address of the image data in the storage unit 111.

Upon issuance of an ID for each document, "1" is set in the ID initially. Then, the image scanning unit 110 counts the number of times of scan while scanning pages of the paper document. When the count value reaches the number of pages of this document, the image scanning unit 110 updates the ID by adding 1 to it, and also resets the count value to 1, thus repeating the same processing. In this way, the IDs can be issued for respective documents.

Also, the "storage address" is full-path information which includes a URL, or a server name, directory, and file name, and indicates the storage location of image data.

In this embodiment, the file format of image data is a BMP format. However, the present invention is not limited to such specific format, and any other formats (e.g., GIF, JPEG) may be used as long as they can preserve color information.

Next, since the user inputs various kinds of information associated with image quality per paper document scanned in step S3000 (to be also referred to as image quality information hereinafter) using the input unit 113, the data processing unit 115 receives and temporarily stores the information in the storage unit 111 in step S3010. A user interface provided by the input unit 113 at this time will be described later.

As a practical example of the image quality information, the resolution (designated by DPI), page layout (Nup print and the like), and paper size of the paper document, the scale upon printing the paper document, the paper quality of a paper sheet of the paper document, the number of times of copy (the number of times of copy from an original of the paper document), the gray-scale setting upon printing the paper document, color or gray-scale printing of the paper document, and the like may be input.

The reason why the above practical example is information that pertains to the image quality will be explained.

The reason why the "resolution upon printing the paper document" is the information that pertains to the image quality is as follows. That is, when the paper document is printed with higher resolution, an image obtained by scanning this paper document has high image quality. Therefore, when the "resolution upon printing the paper document" is designated, this is equivalent to designate whether the image quality of an image obtained by scanning the paper document has high or low image quality.

The reason why the "page layout" is the information that pertains to the image quality is as follows. That is, an image obtained by scanning a paper document obtained by printing information for one page on one sheet has higher image quality (resolution) per page than that of images of respective pages in one image obtained by scanning a paper document obtained by printing a plurality of pages on one sheet. That is, since images of respective pages in an image obtained by scanning an Nup-printed paper document are saved in an enlarged scale, their image quality impairs. Therefore, when the "page layout" is designated, this is equivalent to designate whether the image quality of an image obtained by scanning the paper document has high or low image quality.

The reason why the "paper size" is the information that pertains to the image quality is as follows. That is, as a paper sheet to be printed has a smaller size, characters and images to be printed must be reduced to a smaller scale. Hence, an image obtained by scanning the paper document as the print result has lower image quality of images, characters, and the like. Therefore, when the "paper size" is designated, this is equivalent to designate whether the image quality of an image obtained by scanning the paper document has high or low image quality.

Also, the reason why the "scale upon printing" is the information that pertains to the image quality is as follows. That is, if identical contents are printed at a scale (less than 1×) lower than an equal scale, characters and images to be printed must be reduced to a smaller scale. Hence, an image obtained by scanning the paper document as the print result has lower image quality of images, characters, and the like. Therefore, when the "scale upon printing" is designated, this is equivalent to designate whether the image quality of an image obtained by scanning the paper document has high or low image quality.

The reason why the "paper quality" is the information that pertains to the image quality is as follows. That is, a scan image obtained by scanning a paper document printed on high-quality paper has higher color reproducibility than that obtained by scanning a paper document printed on recycled paper. Therefore, when the "paper quality" is designated, this is equivalent to designate whether the image quality of an image obtained by scanning the paper document has high or low image quality.

The reason why the "number of times of copy" is the information that pertains to the image quality is as follows. That is, since a paper document obtained via many copies suffers a larger noise amount generated on the paper document than that obtained via a fewer copies, an image obtained by scanning the paper document obtained via many copies also has lower image quality of images, characters, and the like. Therefore, when the "number of times of copy" is designated, this is equivalent to designate whether the image quality of an image obtained by scanning the paper document has high or low image quality.

The reason why the "gray-scale setting" is the information that pertains to the image quality is as follows. That is, as the higher gray-scale setting is made, a photo part can be especially clearly expressed. Hence, an image obtained by scanning a paper document as a print result also has higher image quality. Therefore, when the "gray-scale setting" is designated, this is equivalent to designate whether the image quality of an image obtained by scanning the paper document has high or low image quality.

The reason why the "color or monochrome (gray-scale) printing" is the information that pertains to the image quality is as follows. That is, if a document is originally created as a color document, it has higher image quality since it is faithful to an original when it is printed in color. Hence, an image obtained by scanning a paper document as a print result has higher image quality. Therefore, when the "color or monochrome printing" is designated, this is equivalent to designate whether the image quality of an image obtained by scanning the paper document has high or low image quality.

In this manner, upon scanning a paper document, the user inputs the aforementioned information pertaining to the image quality (he or she may input some pieces of the above image quality information) using the input unit 113 in association with this paper document. Note that the image quality information is not limited to those described above, and various other kinds of information may be used.

When a plurality of pieces of information pertaining to the image quality are individually designated as the image quality information, detailed decisions can be made in image quality comparison processing to be described later. However, in order to reduce a load on the user upon inputting the image quality information, a range from the highest image quality to the lowest image quality may be expressed using some levels, and the image quality may be designated by one of these levels. At this time, as the simplest method, the image quality may be expressed by two levels to designate high or low image quality.

When the image quality information includes a plurality of pieces of information that pertain to the image quality, all pieces of information need not be designated, and if given information is unknown, it may be designated as No Information. At this time, the image quality comparison processing to be described later uses information which is not "No Information".

With the above processing, the ID, page number, image quality information, and address as information associated with an image obtained by scanning a sheet of paper document are stored together as "document management information".

FIG. 4 shows an example of the configuration of the document management information. FIG. 4 shows a case wherein two types of paper documents (one is a paper document specified by ID=1, and the other is a paper document specified by ID=2) are registered.

As can be seen from the document management information shown in FIG. 4, the number of pages of the paper document specified by ID=1 is 1, and the contents of two pages are printed on one sheet. Also, as can be seen from FIG. 4, the number of pages of the paper document specified by ID=2 is 2, and the contents of one page are printed on a sheet of each page.

As can be seen from the document management information shown in FIG. 4, as information pertaining to the image quality of an image obtained as a result of scanning the paper document specified by ID=1, the contents of two pages are printed on one sheet (2in1), this paper document is color-printed (color), the paper size of the paper document is A4 (A4), the paper quality of the paper document is recycled paper (recycled paper), the full path of the storage location of the image of the first page is "¥¥abc¥doc¥ship_p1.bmp", and that of the storage location of the image of the second page is "¥¥abc¥doc¥ship_p2.bmp".

The information associated with the image quality of an image of each of the first and second pages obtained by scanning the paper document specified by ID=2 can be obtained with reference to the document management information.

Referring back to FIG. 3A, in step S3011 the number of documents input in step S3000 is stored in a variable P. In step S3012, a variable a indicating the ID of the currently processed document, and a variable b indicating an index for a page included in the currently processed page are initialized by substituting 1 in them.

In step S3013, the number of pages of the document with ID=a is stored in a variable Q with reference to the "number of pages of each document" input in step S3000. For example, since a=1 at first, the number of pages of a document with ID=1 is stored in the variable Q.

In step S3014, the value stored in the variable P is compared with that stored in the variable a, and if P≧a, i.e., if the processes to be described below are not applied to all documents, the flow advances to step S3015. In step S3015, the value stored in the variable Q is compared with that stored in the variable b, and if Q≧b, i.e., if the processes to be described below are not applied to all pages of the document with ID=a, the flow advances to step S3020. In step S3020, block selection (BS) processing is applied to a scan image of the b-th page of the document with ID=a. This processing is executed by a CPU (not shown) of the management PC 101.

More specifically, the CPU of the management PC 101 reads out a raster image to be processed (the scan image of the b-th page of the document with ID=a) stored in the storage unit 111. When this processing is executed for the first time, since a=b=1, an image of the first page of the document with ID=1 is read out. If the document management information is the one shown in FIG. 4, an image stored at the storage location "¥¥abc¥doc¥ship_p1.bmp" is read out.

After the image is read out, it undergoes region segmentation into a text/line image part and halftone image part, and the text/line image part is further segmented into blocks massed as paragraphs or into tables, graphic patterns, and the like defined by lines.

On the other hand, the halftone image part is segmented into an image part as a block separated in a rectangular pattern, a block of a background part, and the like.

The page number of the page to be processed and block IDs that specify respective blocks in that page are issued, and attributes (image, text, and the like), sizes, and positions (coordinates in the page) in an original document of respective blocks are stored as block information in the storage unit 111 in association with the respective blocks.

FIG. 5 shows an example of the configuration of the block information. As can be seen from the example of FIG. 5, the first page of the document with ID=1 is broken up into three blocks, the attribute of a block with, e.g., block ID=1 is "image", the size is 30 pixels×30 pixels, and the upper left corner position of this block is (5, 5) if the coordinates of the upper left corner of the scan image are (0, 0).

Note that details of the block selection processing will be described later.

In step S3030, the CPU executes feature amount information extraction processing for extracting feature amount information of respective blocks in correspondence with the types of the respective blocks.

Especially, as for each text block, the image scanning unit 110 applies OCR processing to extract character codes to obtain them as a text feature amount. Also, as for each image block, an image feature amount associated with a color is extracted. At this time, feature amounts corresponding to respective blocks are combined for each document, and are stored as feature amount information in the storage unit 111 in association with the document ID, page number, and block IDs.

FIG. 6 shows an example of the configuration of a table used to manage feature amounts extracted from image blocks. FIG. 7 shows an example of the configuration of a table used to manage feature amounts extracted from text blocks.

Details of the feature amount extraction processing will be described later.

The flow advances to step S3031 to increment the value held by the variable b by 1 to select the next page as the page to be processed. The flow then returns to step S3014 to repeat the subsequent processes.

If Q<b in step S3015, i.e., if all the pages of the document with ID=a have been processed, the flow advances to step S3032 to increment the value held by the variable a by 1 so as to select a document with the next ID as the document to be processed. The flow then returns to step S3014 to repeat the subsequent processes.

If P<a in step S3014, i.e., if all the documents have been processed, this processing ends.

With the above processing, images of respective pages of respective documents, and information pertaining to the respective pages can be registered in the storage unit 111. Note that the registration destination is not limited to the storage unit 111, and it may be one of the databases 105*a* and 105*b*.

<Retrieval Processing>

Figure 3B:
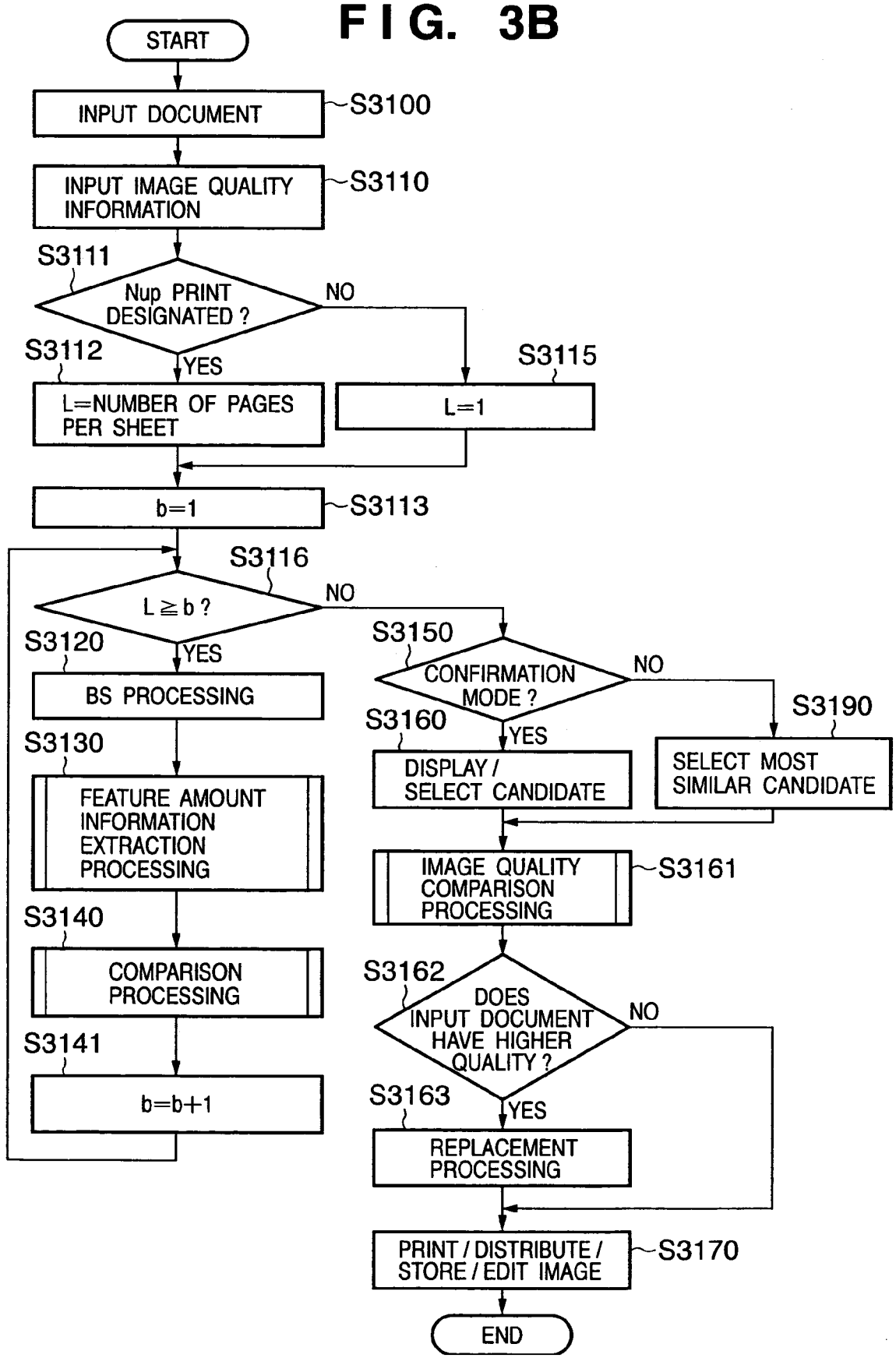
FIG. 3B is a flowchart of retrieval processing for retrieving desired one of digital data of original documents registered in the storage unit 111.

Retrieval processing for retrieving desired one of digital data of original documents registered in the storage unit 111, as described above, will be described below using FIG. 3B that shows the flowchart of the processing.

In the following description, assume that a paper document as a query is a sheet of paper document on which one or pages are printed.

In step S3100, the image scanning unit 110 scans, as a scan image, information printed on a paper document as a query in the same manner as in step S3000.

In step S3110, image quality information about the paper document as the query is input in the same manner as in step S3010.

It is checked with reference to the information which is input in step S3110 and is held in the storage unit 111 if the image obtained by scanning the paper document as the query (to be also referred to as a query image hereinafter) is Nup-printed (step S3111).

If the query image is Nup-printed (YES in step S3111), the flow advances to step S3112 to store "the number of pages included in one sheet of paper document" obtained in step S3110 in a variable L.

On the other hand, if the query image is not Nup-printed (NO in step S3111), the flow advances to step S3115, and since "the number of pages included in one sheet of paper document is 1", "1" is stored in the variable L.

In step S3113, a variable b indicating an index for each page included in the query image is initialized by substituting "1" in it. The flow advances to step S3116 to compare the value stored in the variable L and that stored in the variable b. If L≧b, i.e., if the processes to be described below are not applied to each page in the query image, the flow advances to step S3120 to apply block selection (BS) processing to the query image.

Figure 8:
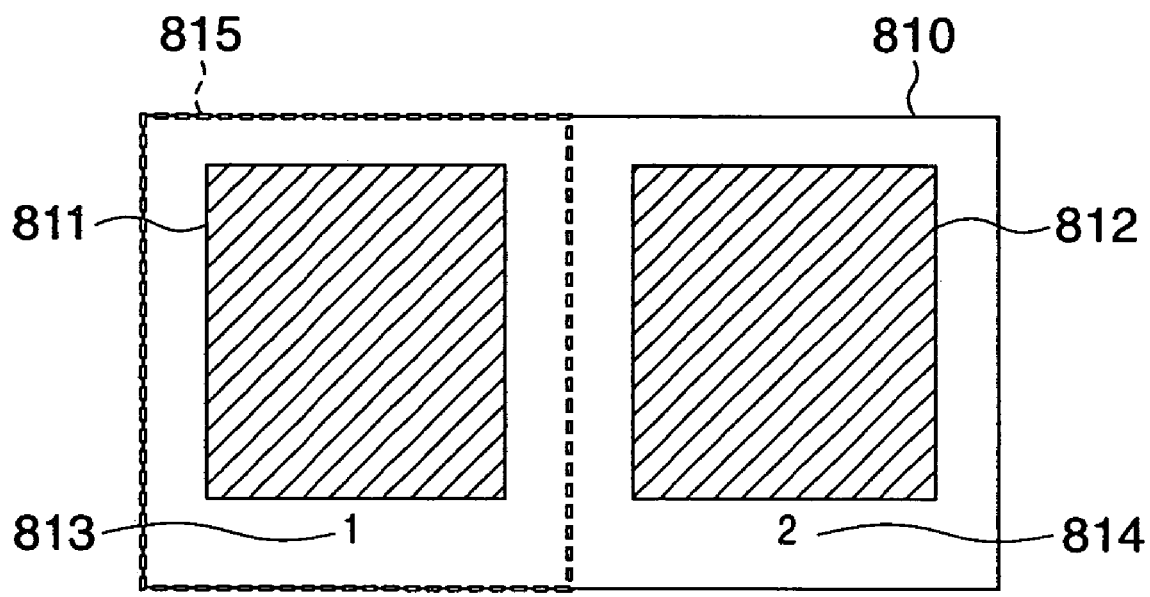
FIG. 8 shows an example of a query image obtained by Nup-printing two pages (a query image obtained when a 2in1 paper document is input as a query in step S3100)

A practical example of the block selection processing at that time will be described below using FIG. 8. FIG. 8 shows an example of a query image obtained by Nup-printing two pages (a query image obtained when a 2in1 paper document is input as a query in step S3100).

Referring to FIG. 8, reference numeral 810 denotes the entire region of one sheet; and 811 and 812, page images of respective pages. Reference numerals 813 and 814 denote page numbers of the respective pages. When b=1, the block selection processing is applied to only a region 815 to be processed including the page image 811 of the first page. In the example of FIG. 8, when b=2, the block selection processing is applied to a region to be processed including the page image 812 of the second page.

Note that this block selection processing itself is the same as that in step S3020, and a description thereof will be omitted. The region to be processed is determined on the basis of a predetermined processing order by dividing one sheet of paper document into L regions on the basis of the value L and the orientation of the paper document.

In step S3130, feature amounts of respective blocks are extracted. Since this processing is the same as that in step S3030, a description thereof will be omitted.

In step S3140, the feature amount of the image of the b-th page in the query image is compared with those of respective images registered in advance in the storage unit 111 to retrieve images which have similarity levels equal to or larger than a predetermined value with the image of the b-th page in the query image. That is, images which are similar to the image of the b-th page in the query image to some extent or higher of those which are registered in advance in the storage unit 111 are specified, and the specified images are output as retrieval results. Details of the retrieval processing will be described later.

In step S3141, the value held by the variable b is incremented by 1 to select the next image in the query image as the image to be processed, and the flow returns to step S3116 to repeat the subsequent processes.

If L<b in step S3116, i.e., if the processes in steps S3120 to S3140 have been applied to respective pages in the query image, the flow advances to step S3150 to check if a user confirmation mode is set.

The user confirmation mode is a mode for making the operator confirm one or more images retrieved by the comparison processing in step S3140 by displaying them on the display screen of the display unit 116. Details of this confirmation screen will be described later. This mode can be set in advance using the input unit 113.

If the user confirmation mode is set (YES in step S3150), the flow advances to step S3160 to generate and display thumbnail images of one or more images as the retrieval results on the display screen of the display unit 116, and prompt the operator to select one of these images using the input unit 113. For example, when the query image includes two images, one retrieval result for the image of the first page is selected, and one retrieval result for the image of the second page is selected.

On the other hand, if no user confirmation mode is set (NO in step S3150), the flow advances to step S3190, and the CPU of the management PC 101 selects most similar images of those which are registered in advance in the storage unit 111, one each for respective pages in the query image.

After the processing in step S3160 or S3190, the flow advances to step S3161, the image quality of the image of the page of interest of those in the query image is compared with that of the image selected in step S3160 or S3190 in correspondence with the image of the page of interest. Details of the image quality comparison processing will be described later.

As a result of the image quality comparison processing between the image of the page of interest in the query image and that selected in step S3160 or S3190 in correspondence with the image of the page of interest, if it is determined in step S3162 that the image of the page of interest has higher image quality, the flow advances to step S3163 to execute processing for referring to the storage address of "the image selected in step S3160 or S3190 in correspondence with the image of the page of interest", deleting the image stored at that address, and registering the data of the image of the page of interest in a storage area specified by this storage address. Upon registering the image of the page of interest, pre-processing is applied to that image by the data processing unit 115, and the processed image is saved in the storage unit 111 as in the registration processing. Also, the image quality information input in step S3110 for this image of the page of interest is registered in place of that of the image selected in step S3160 or S3190 in correspondence with the image of the page of interest. Likewise, the block information is registered in place of that of the image selected in step S3160 or S3190 in correspondence with the image of the page of interest.

More specifically, the processing is executed to register the image of the page of interest and information associated with the image of the page of interest in the storage unit 111 to function in place of the image selected in step S3160 or S3190 in correspondence with the image of the page of interest and information associated with this image. Hence, the registration processing itself is not particularly limited as long as the image of the page of interest and information associated with the image of the page of interest are registered in the storage unit 111 for the purpose of functioning in place of the image selected in step S3160 or S3190 in correspondence with the image of the page of interest and information associated with this image.

With the above processing, an image with the highest image quality of query images input so far is registered in the storage unit 111.

In step S3170, one of print, distribution, storage, and edit processes is executed for the query image on the basis of user's operations via a user interface implemented by the display unit 116 and input unit 113.

On the other hand, if it is determined in step S3162 that the image of the page of interest has lower image quality, the flow advances to step S3170 while skipping the processing in step S3163.

<Details of Block Selection Processing>

The block selection processing executed in steps S3020 and S3120 will be described in more detail below. In this processing, a raster image shown in FIG. 9A is recognized as clusters for respective significant blocks, as shown in FIG. 9B, attributes (text (TEXT)/picture (PICTURE)/photo (PHOTO)/line (LINE)/table (TABLE), etc.) of respective blocks are determined, and the raster image is segmented into blocks having different attributes. FIGS. 9A and 9B are views for explaining the block selection processing.

As an example of processing for this purpose, an image is binarized to a monochrome image, and a cluster of pixels bounded by black pixels is extracted by contour tracing. For a cluster of black pixels with a large area, contour tracing is made for white pixels in the cluster to extract clusters of white pixels. Furthermore, a cluster of black pixels is recursively extracted from the cluster of white pixels with a predetermined area or more.

The obtained clusters of black pixels are classified into blocks having different attributes in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text block. Also, a low-profile pixel cluster is categorized as a line block, a range having a predetermined area or more and occupied by black pixel clusters that include rectangular white pixel clusters which regularly line up is categorized as a table block, a region where pixel clusters with indeterminate forms are distributed is categorized as a photo block, and other pixel clusters with an arbitrary shape is categorized as a picture block, and so forth.

Note that the block selection processing is the state-of-the-art technique, and no more explanation will be given.

<Details of Input of Image Quality Information>

A user interface displayed on the display screen of the display unit 116 to input image quality information in steps S3010 and S3110 will be described below.

Figure 14:
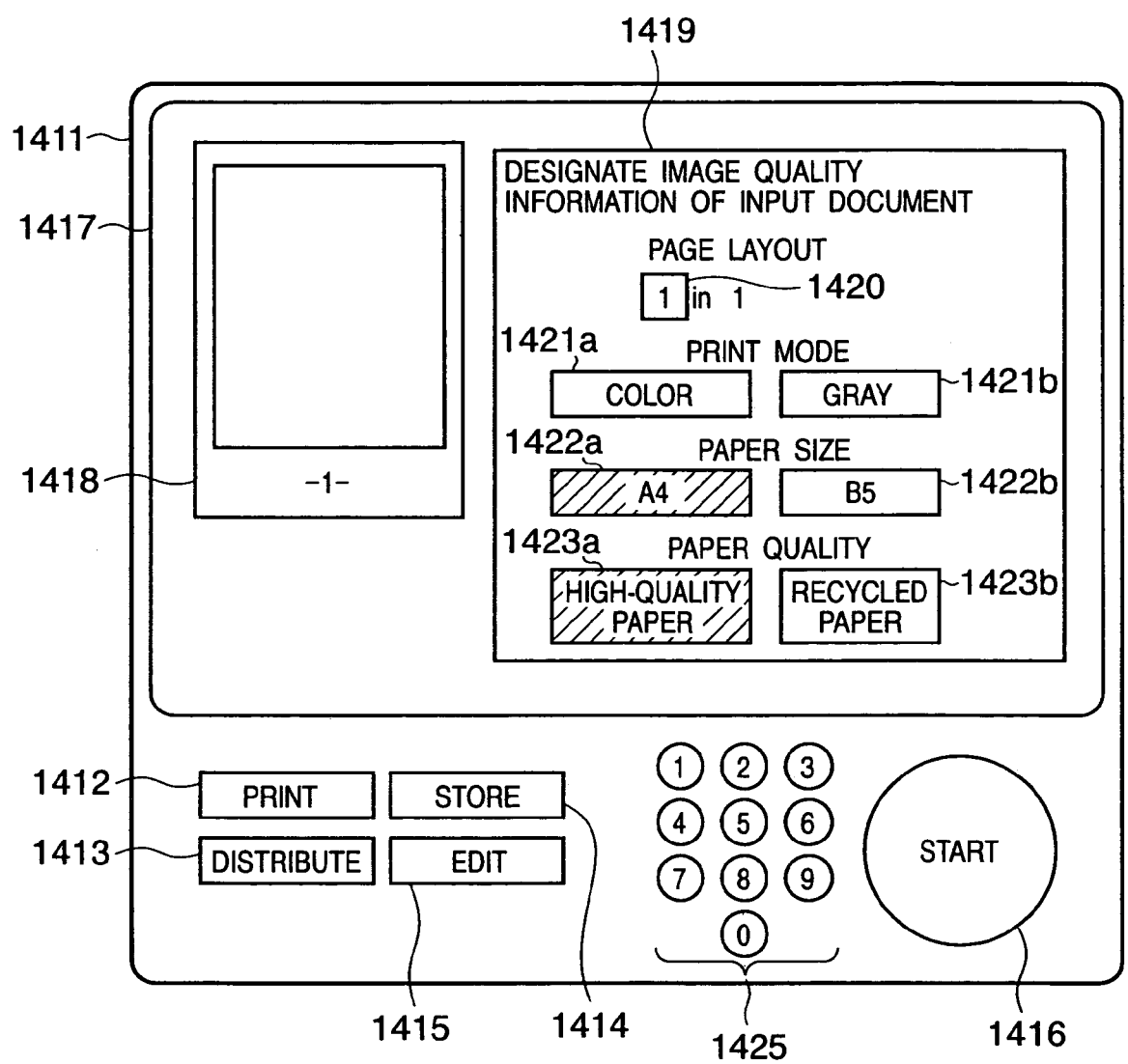
FIG. 14 shows a display example of a user interface displayed on the display screen of a display unit 116 so as to input image quality information in steps S3010 and S3110.

FIG. 14 shows a display example of this user interface. In FIG. 14, a display part and operation part are present together: the display part corresponds to the display unit 116 and the operation part corresponds to the input unit 113.

Reference numeral 1411 denotes a display/operation panel. Reference numerals 1412 to 1415 denote various function buttons. These function buttons 1412 to 1415 are to be pressed to issue a print instruction, distribution instruction, storage instruction, and edit instruction of an image to be processed, respectively.

Reference numeral 1416 denotes a start button. When the start button 1416 is pressed, the function selected by the function button can be executed. Reference numeral 1425 denotes a numeric keypad, which allows the user to designate the number of sheets upon printing, the number of pages to be included per sheet in the Nup print mode, and image quality information which must be input as a numerical value.

Reference numeral 1417 denotes a display area which comprises a touch panel, and allows the user to make selection and instruction when he or she directly touches the screen. Reference numeral 1418 denotes a paper document confirmation area, which displays a paper document image scanned by the image scanning unit 110 while reducing that image to a size that falls within the area 1418. The user can confirm the state of the paper document image by observing this area 1418.

Reference numeral 1419 denotes an area for designating the image quality of an input document.

Reference numeral 1420 denotes a field for displaying the number of pages printed in one sheet of paper document scanned by the image scanning unit 110. This field 1420 can display a numerical value designated using the numeric keypad 1425.

Reference numerals 1421*a* and 1421*b* denote button images displayed in the display area 1419. By designating one of the button images, the user can designate whether the print mode of a paper document scanned by the image scanning unit 110 is color or monochrome.

Reference numerals 1422*a* and 1422*b* denote button images displayed in the display area 1419. By designating one of the button images, the user can designate whether the paper size of a paper document scanned by the image scanning unit 110 is A4 or B5.

Reference numerals 1423*a* and 1423*b* denote button images displayed in the display area 1419. By designating one of the button images, the user can designate whether the paper quality of a paper document scanned by the image scanning unit 110 is high-quality paper or recycled paper.

As for the print mode, paper size, and paper quality, candidates of values that can be designated are displayed in the form of buttons. In order to indicate the designated state, the display mode of the designated button is changed to colored display, blink display, highlight display, or the like.

By configuring such user interface, the image quality information of the scanned paper document can be designated while displaying its state.

<Details of Feature Amount Extraction Processing>

Details of the feature amount extraction processing in steps S3030 and S3130 will be described below. Note that the feature amount extraction processing uses different processing methods for an image block and text block, and these methods will be separately described. Assume that an image block includes a photo block and picture block in the example of FIG. 9B. However, the image block may be set as at least one of the photo block and picture block in accordance with the use application and purpose.

The feature amount extraction processing for an image block will be explained first. When one document includes a plurality of image blocks, the following processing is repeated in correspondence with the total number of image blocks.

In this embodiment, as an example of the feature amount extraction processing, a color feature amount associated with colors of an image is extracted.

Figure 10:
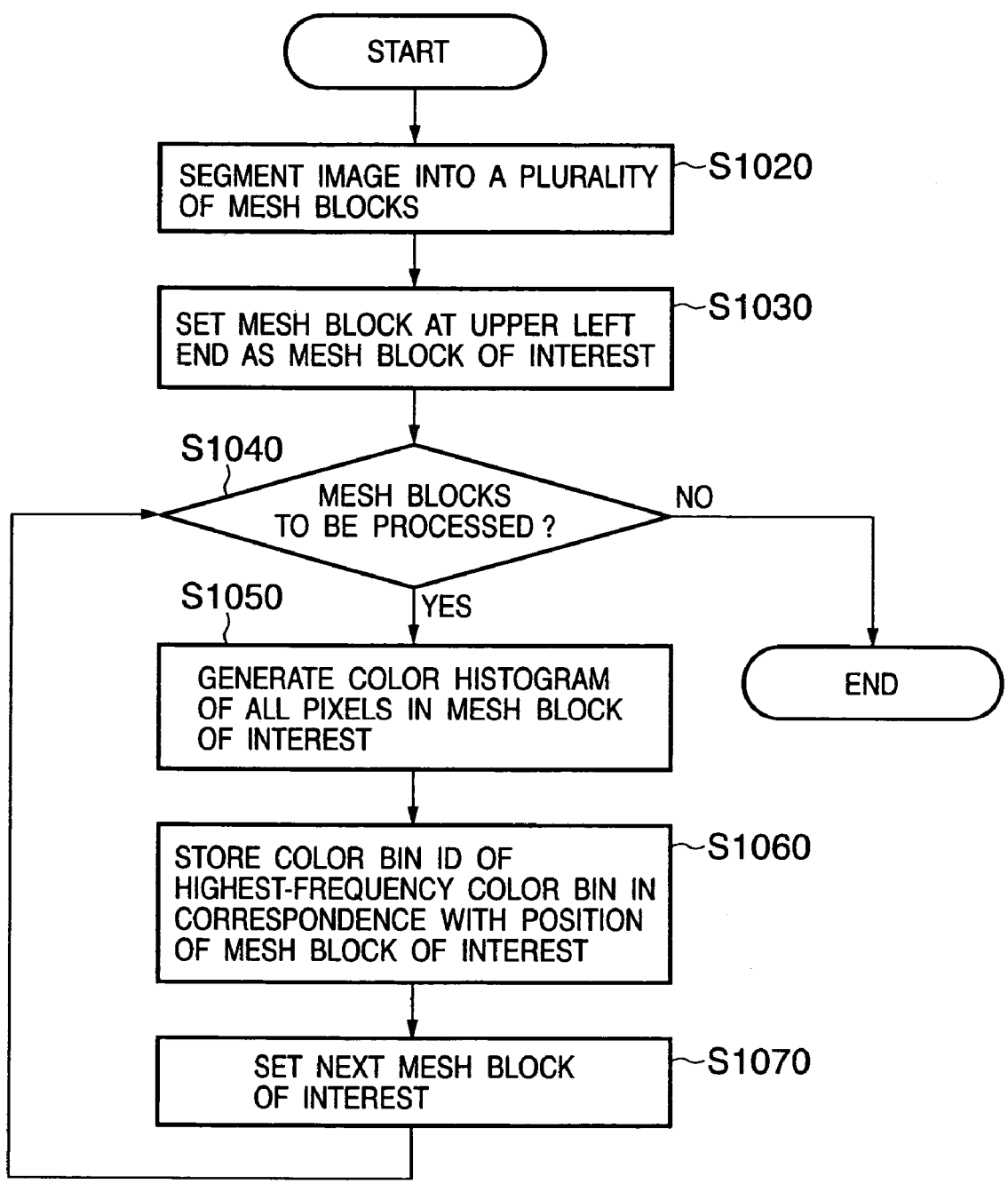
FIG. 10 is a flowchart showing details of feature amount extraction processing from an image block according to the first embodiment of the present invention.

FIG. 10 is a flowchart showing details of the feature amount extraction processing from an image block according to this embodiment. That is, FIG. 10 shows the flowchart of the feature amount extraction processing executed for a block to be processed, when "attribute" included in the block information of the block to be processed indicates "image".

Note that this processing extracts, as color feature information, information which associates a color having a highest-frequency color in a color histogram of each mesh block obtained by segmenting an image block into a plurality of mesh blocks with the position information of that mesh block.

Figure 11:
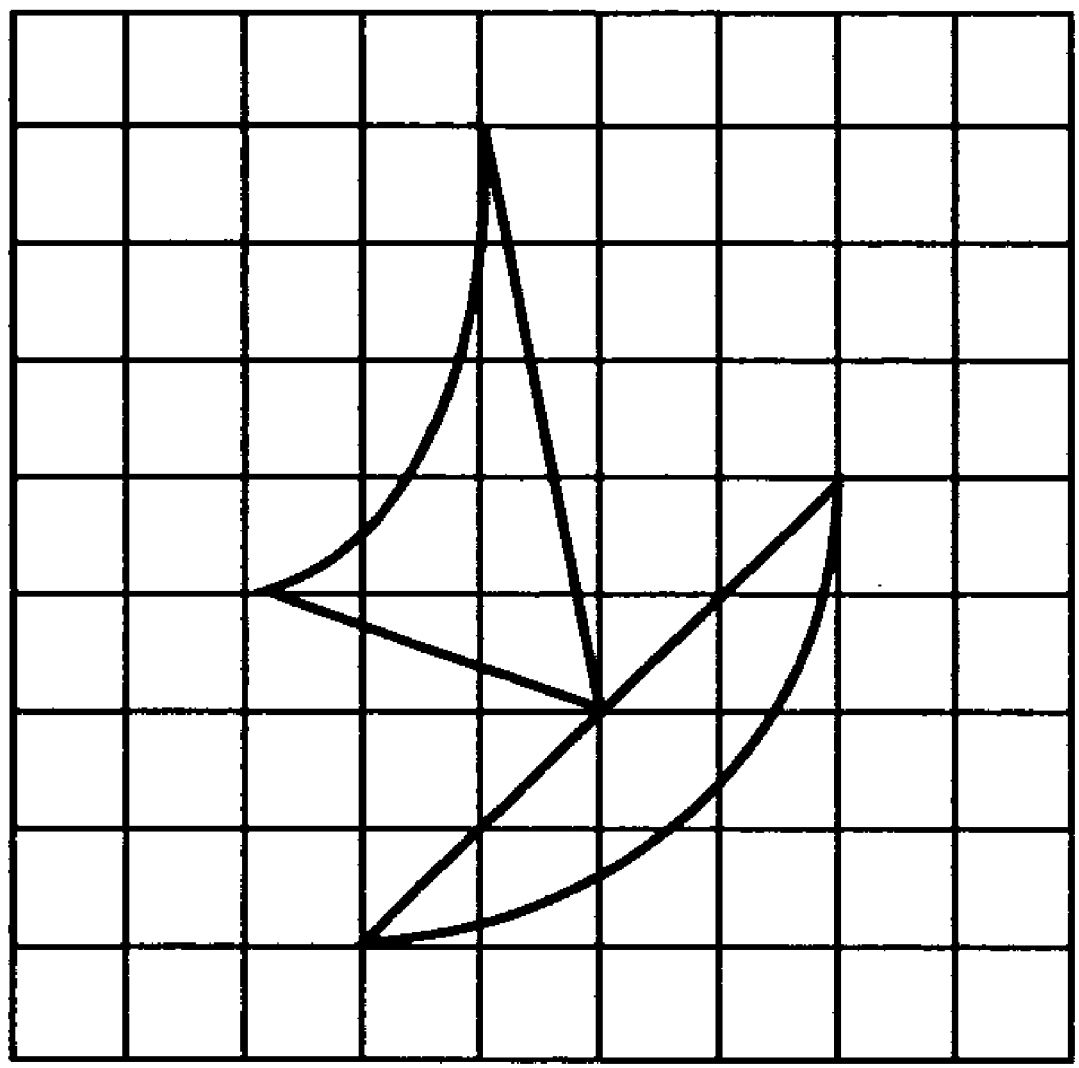
FIG. 11 is a view for explaining mesh block segmentation.

In step S1020, an image block is segmented into a plurality of mesh blocks. In this embodiment, as shown in FIG. 11, an image block is segmented into 9 (vertical)×9 (horizontal) mesh blocks. Especially, this embodiment exemplifies a case wherein the image block is segmented into 9×9=81 mesh blocks for the sake of descriptive convenience. However, in practice, the image block is preferably segmented into 15×15=225 mesh blocks. FIG. 11 is a view for explaining mesh block segmentation.

Figure 12:
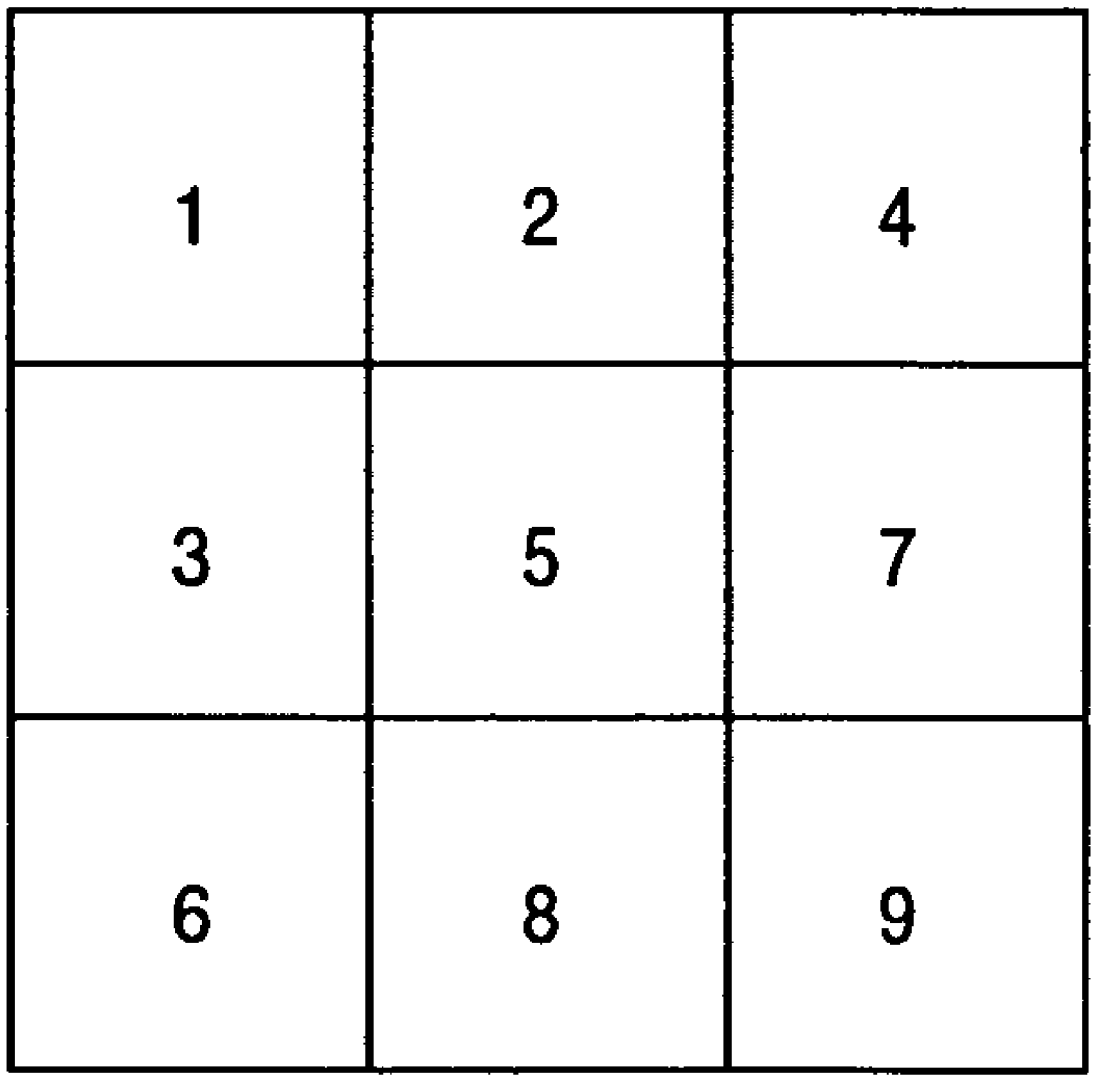
FIG. 12 shows an example of the configuration of an order determination table.

In step S1030, a mesh block at the upper left end is set as a mesh block of interest to be processed. Note that the mesh block of interest is set with reference to an order determination table in which the processing order is predetermined, as shown in FIG. 12. FIG. 12 shows an example of the configuration of the order determination table.

It is checked in step S1040 if unprocessed mesh blocks of interest remain. If no mesh block to be processed remains (NO in step S1040), the processing ends. If mesh blocks to be processed remain (YES in step S1040), the flow advances to step S1050.

Figure 13:
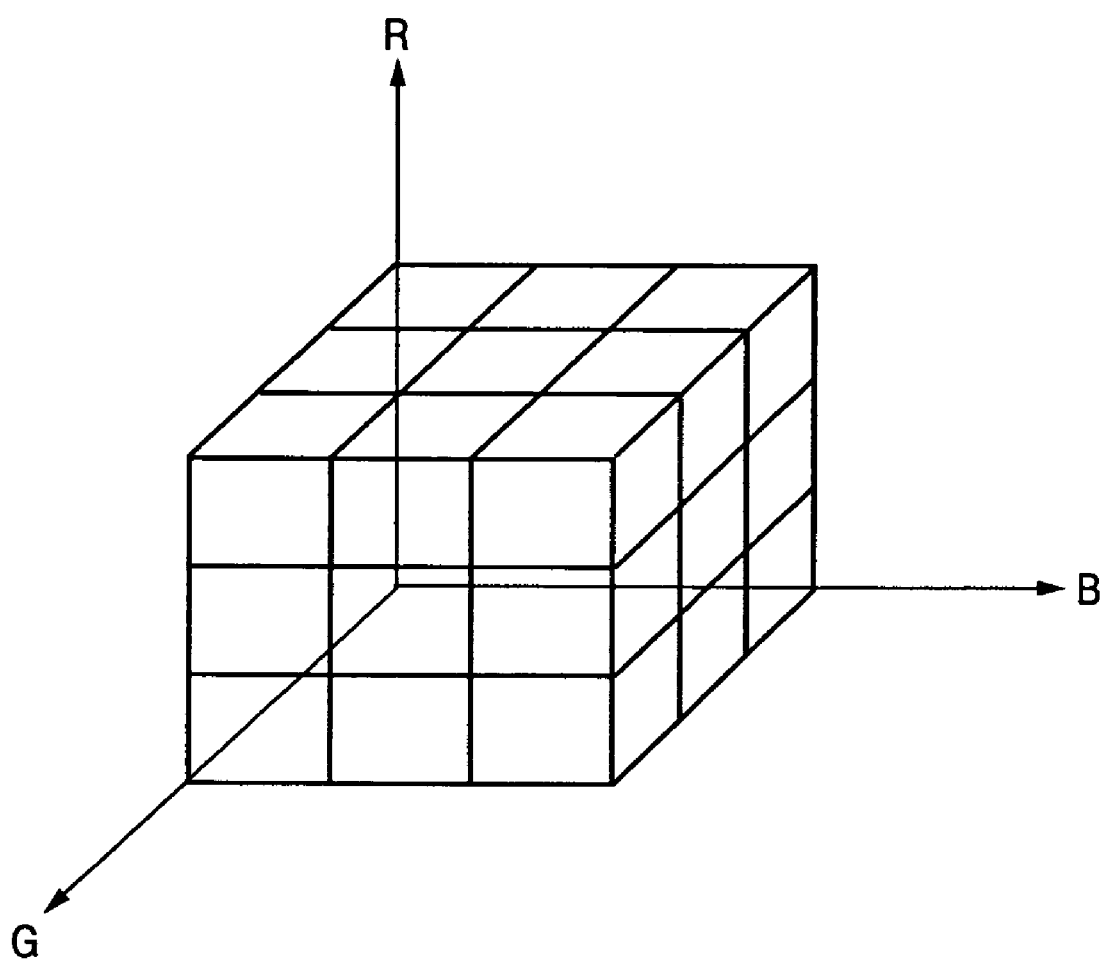
FIG. 13 shows color bins on an RGB color space.

In step S1050, respective density values of all pixels which form the mesh block of interest are projected onto color bins as a partial space formed by dividing a color space shown in FIG. 13, thus generating a color histogram for the color bins. FIG. 13 shows color bins on an RGB color space.

Note that this embodiment exemplifies a case wherein the density values of all the pixels of the mesh block of interest are projected onto color bins formed by dividing the RGB color space into 3×3×3=27, as shown in FIG. 13. However, in practice, the density values of all the pixels of the mesh block of interest are preferably projected onto color bins formed by dividing the RGB color space into 6×6×6=216.

In step S1060, the color bin ID of the highest-frequency color bin of the color histogram is determined as a representative color of the mesh block of interest, and is stored in the storage unit 111 in association with the position of the mesh block of interest in the image block.

In step S1070, a mesh block of interest to be processed next is set with reference to the order determination table shown in FIG. 12. After that, the flow returns to step S1040 to repeat the processes in steps S1040 to S1070 until all mesh blocks are processed.

With the above processing, the information which associates the representative color information with the position information of each mesh block for each mesh block of an image block can be extracted as color feature amount information.

Next, the feature amount extraction processing for a text block will be described below. When one document includes a plurality of text blocks, the following processing is repeated in correspondence with the total number of text blocks. That is, the feature amount extraction processing in a flowchart is executed for a block to be processed when "attribute" included in the block information of the block to be processed indicates "text".

Assume that text feature amount information for a text block includes character codes obtained by applying OCR (character recognition) processing to that text block.

The OCR (character recognition) processing performs character recognition for a character image extracted from a text block for respective characters using a given pattern matching method, and acquires a corresponding character code.

In this character recognition processing, an observation feature vector obtained by converting a feature acquired from a character image into a several-ten-dimensional numerical value string is compared with dictionary feature vectors obtained in advance for respective character types, and a character type with a shortest distance is output as a recognition result.

Various known methods are available for feature vector extraction. For example, a method of dividing a character into a mesh pattern, and counting character lines in respective mesh blocks as line elements depending on their directions to obtain a (mesh count)-dimensional vector as a feature is known.

When a text block extracted by the block selection processing (step S3020 or S3120) undergoes character recognition, the writing direction (horizontal or vertical) is determined for that text block, a character string is extracted in the determined direction, and characters are then extracted from the character string to acquire character images.

Upon determining the writing direction (horizontal or vertical), horizontal and vertical projections of pixel values in the text block are calculated, and if the variance of the horizontal projection is larger than that of the vertical projection, that text block can be determined as a horizontal writing block; otherwise, that block can be determined as a vertical writing block. Upon decomposition into character strings and characters, in case of a horizontal writing text block, lines are extracted using the horizontal projection, and characters are extracted based on the vertical projection for the extracted line. In case of a vertical writing text block, the relationship between the horizontal and vertical parameters may be exchanged.

<Details of Comparison Processing>

Details of the comparison processing in step S3140 will be described below.

Figure 15:
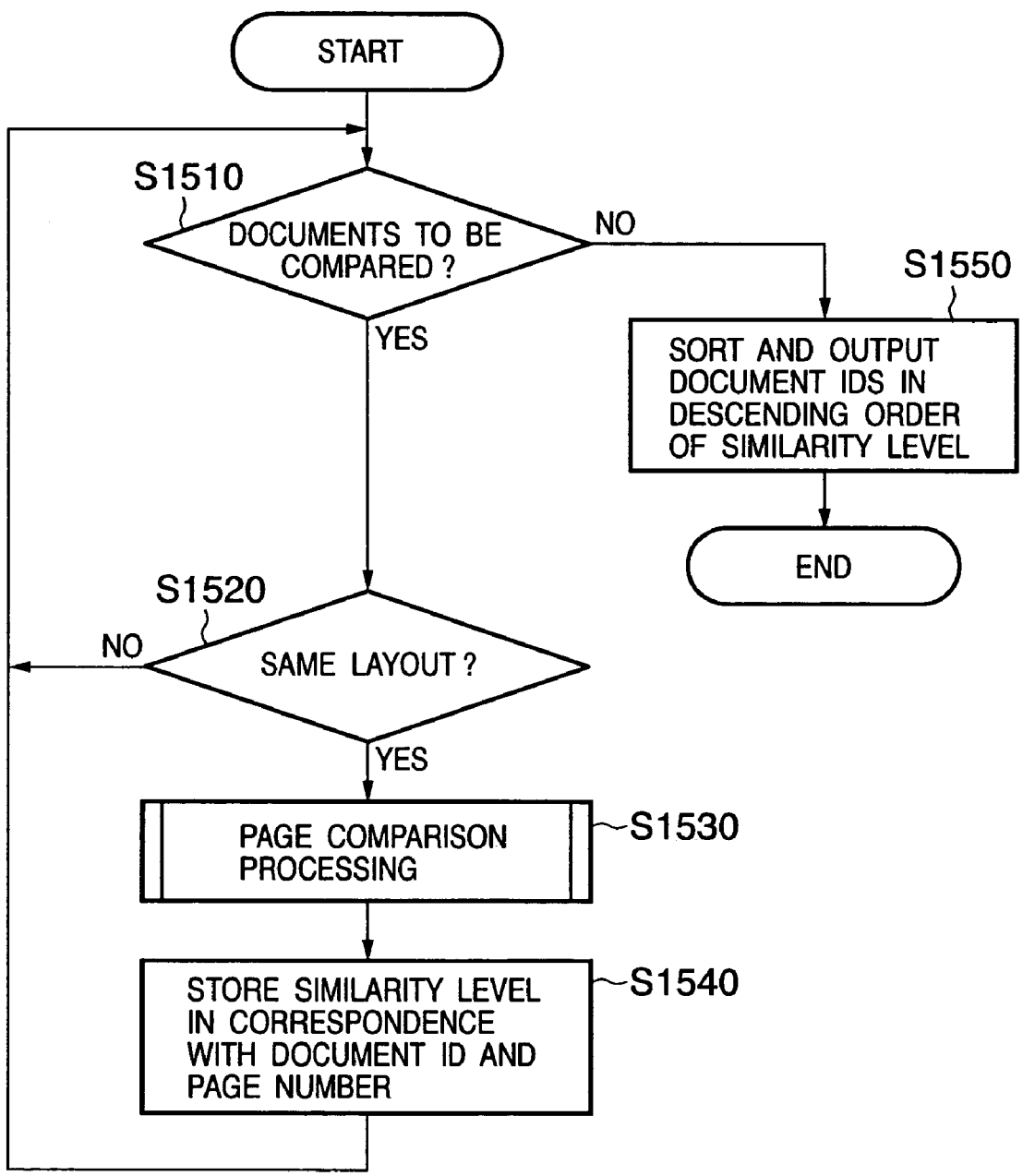
FIG. 15 is a flowchart showing details of comparison processing in step S3140.

FIG. 15 is a flowchart showing details of the comparison processing in step S3140.

Images registered in the storage unit 111 are referred to for the purpose of comparison with images of respective pages in a query image. It is checked in step S1510 if all images registered in the storage unit 111 have been referred to. If images to be referred to still remain, the flow advances to step S1520 to check if the image (to be referred to as a reference source image hereinafter) of the b-th page (b is an index for each page in the query image) in the query image has the same layout as that of one (to be referred to as a reference destination image hereinafter) of images which are registered in the storage unit 111 and are not referred to yet. Note that the layout includes the attribute, size, and position of a block indicated by the block information.

That is, it is checked in step S1520 if blocks at the same position in the reference source image and reference destination image have the same attribute. If these images have different layouts (if one or more blocks at the same positions in the reference source image and reference destination image have different attributes), the flow returns to step S1510 to select one of the images which are registered in the storage unit 111 and are not referred to yet as the next reference destination image, thus repeating the subsequent processes.

On the other hand, if all the blocks which form the reference source image and those which form the reference destination image at the same positions have identical attributes, the flow advances to step S1530 to compare the pages of the reference source image and reference destination image. In this comparison, multiple comparison processes are executed using feature amounts corresponding to text and image blocks in accordance with the attributes of blocks to calculate a similarity level. That is, the similarity level between the reference source image and reference destination image is calculated. Details of this processing will be described later.

In step S1540, the similarity level calculated in step S1530 is temporarily stored in the storage unit 111 in correspondence with the ID and page number of the reference destination image.

Upon completion of comparison with all the documents in step S1510, the flow advances to step S1550, and the document IDs and page numbers are sorted and output in descending order of similarity level.

Details of the processing in step S1530 will be described below using FIG. 16 that shows the flowchart of this processing.

Figure 16:
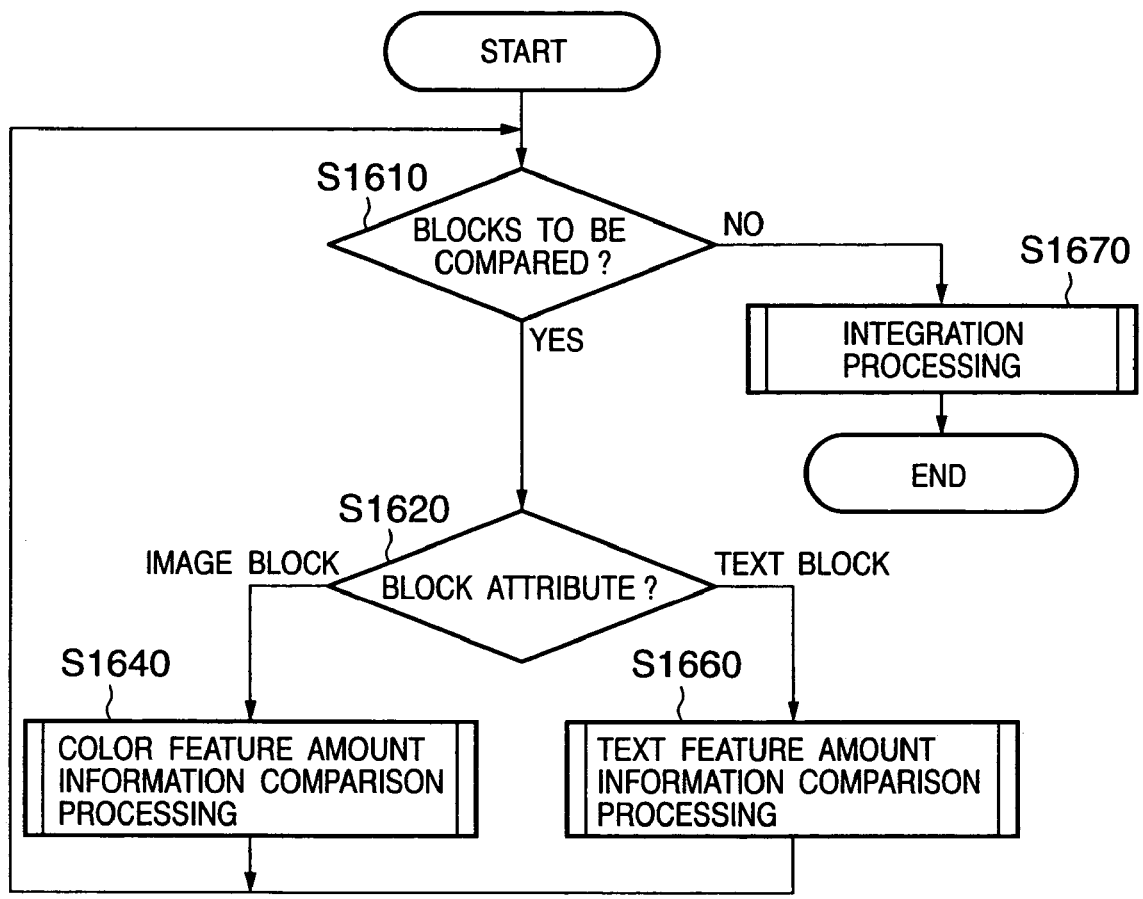
FIG. 16 is a flowchart of processing in step S1530.

FIG. 16 is a flowchart showing details of the processing in step S1530. It is checked in step S1610 if blocks to be compared still remain in the reference source image and reference destination image. If blocks to be compared still remain, the flow advances to step S1620. In step S1620, with reference to the block information of a block (to be referred to as a reference source block hereinafter) in the reference source image and a block (to be referred to as a reference destination block hereinafter) in the reference destination image, the attributes of the reference source block and reference destination block are checked. That is, it is determined if these blocks are image or text blocks.

If these blocks are image blocks, the flow advances to step S1640 to execute processing for calculating a similarity level of the color feature amounts of the reference source block and reference destination block. Details of the processing in step S1640 will be described later. Note that the similarity level calculated in step S1640 is temporarily stored in the storage unit 111 in correspondence with the document ID and page number of the reference destination image and the block ID of the reference destination block.

On the other hand, if these blocks are text blocks, the flow advances to step S1660 to execute processing for calculating a similarity level of the text feature amounts of the reference source block and reference destination block. Details of the processing in step S1660 will be described later. Note that the similarity level calculated in step S1660 is temporarily stored in the storage unit 111 in correspondence with the document ID and page number of the reference destination image and the block ID of the reference destination block.

Upon completion of comparison with all the blocks in step S1610 (NO in step S1610), the flow advances to step S1670 to integrate the similarity levels which are calculated for all the block pairs by the processes in steps S1640 and S1660 and are stored in the storage unit 111, thus calculating a similarity level between the reference source image and reference destination image. Details of the processing in step S1670 will be described later.

Figure 17:
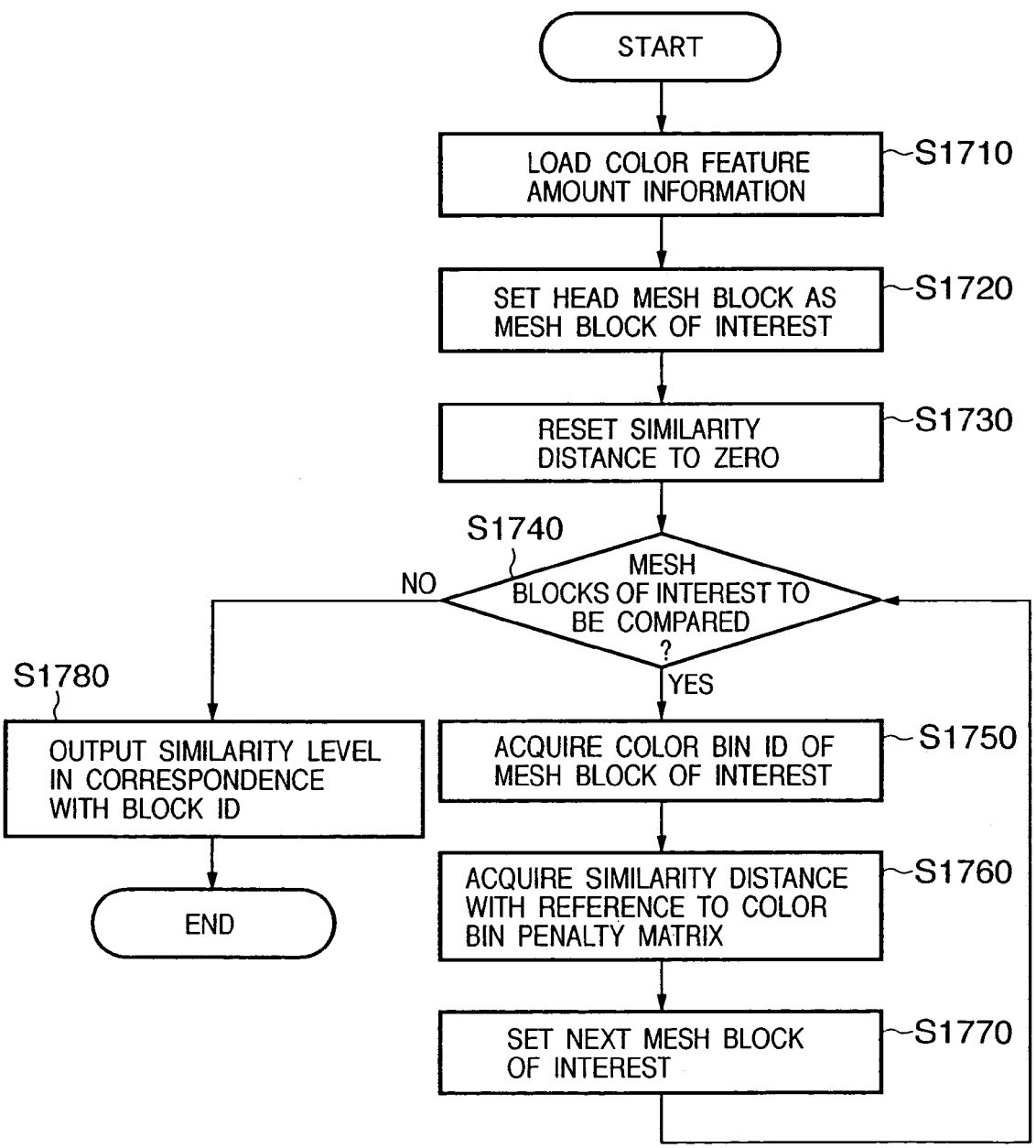
FIG. 17 is a flowchart of color feature amount comparison processing in step S1640.

Details of the color feature amount comparison processing in step S1640 will be described below using FIG. 17 which shows the flowchart of that processing.

In step S1710, the color feature amount information of the reference source block and that of the reference destination block are read out.

In step S1720, a head mesh block is set as a mesh block of interest to be processed. In step S1730, a similarity distance to be calculated is reset to zero.

It is checked in step S1740 if mesh blocks of interest to be compared still remain. If no mesh block of interest to be compared remains (NO in step S1740), the flow advances to step S1780. On the other hand, if mesh blocks of interest to be compared still remain (YES in step S1740), the flow advances to step S1750.

In step S1750, the color bin ID of the mesh block of interest is acquired from the color feature amount information of the reference source block, and that of the mesh block of interest is acquired from the color feature amount information of the reference destination block.

Figure 18:
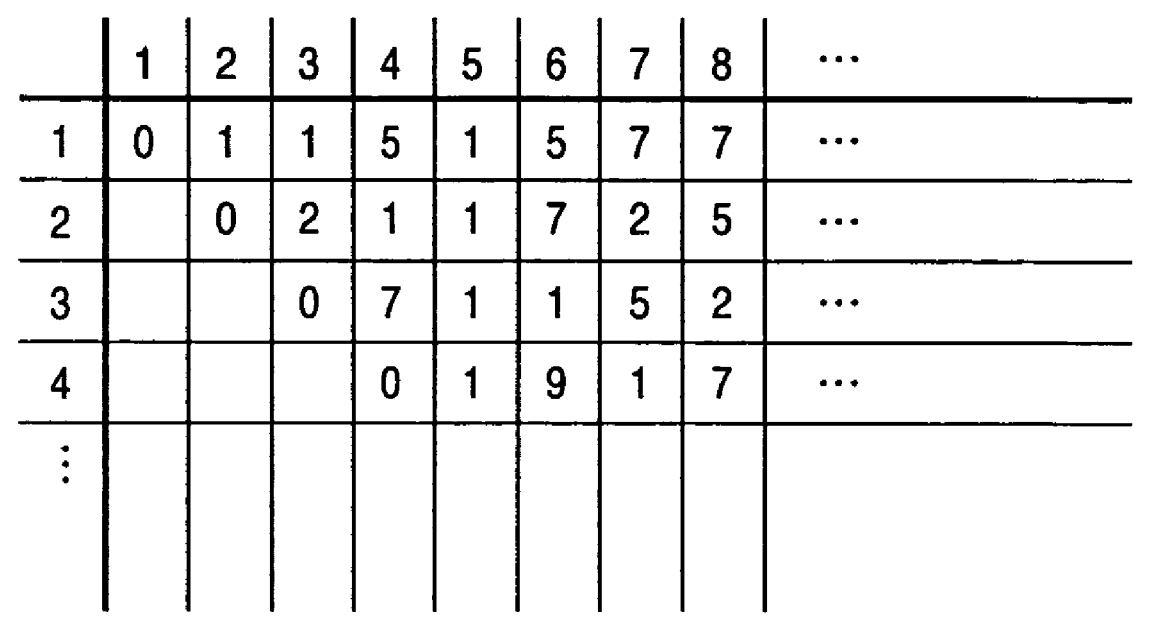

In step S1760, a similarity distance between the color bin IDs acquired in step S1750 is acquired with reference to a color bin penalty matrix exemplified in FIG. 18, and is cumulatively added to that acquired in the immediately proceeding processing, and the sum is stored in the storage unit 111.

The color bin penalty matrix will be described below using FIG. 18. FIG. 18 shows an example of the configuration of the color bin penalty matrix used in this embodiment.

The color bin penalty matrix is a matrix used to manage local similarity distances between color bin IDs. According to FIG. 18, in the color bin penalty matrix, identical color bin IDs have zero similarity distance, and the similarity distance becomes larger as the difference between the color bin IDs becomes larger, i.e., the similarity level becomes lower. The diagonal positions between identical color bin IDs have zero similarity distance, and the matrix has symmetry to have the diagonal positions as a boundary.

In this embodiment, since the similarity distance between the color bin IDs can be acquired with reference to only the color bin penalty matrix, high-speed processing is guaranteed.

In step S1770, the mesh block of interest as the next mesh block to be processed is set with reference to the order determination table shown in FIG. 12. After that, the flow returns to step S1740.

If it is determined in step S1740 that no mesh block of interest to be compared remains (NO in step S1740), the flow advances to step S1780. In step S1780, the similarity distance stored in the storage unit 111 is converted into a similarity level, which is output together with the block ID of the reference source block.

Upon conversion to the similarity level, for example, a similarity level=100% is defined when the similarity distance assumes a minimum value, a similarity level=0% is defined when the similarity distance assumes a maximum value, and a similarity level corresponding to the similarity distance within this range can be calculated on the basis of a difference from the minimum or maximum value.

Details of the comparison processing in step S1660 will be described below.

In this processing, character codes in corresponding text blocks of the reference source image and reference destination image are compared, and a similarity level is calculated based on their matching level. It is ideal that a similarity level becomes 100%. However, in practice, since the OCR processing applied to a text block in the reference source image may cause recognition errors, the similarity level does not often reach 100% but it assumes a value proximate to 100%.

<Details of Integration Processing>

Details of the integration processing in step S1670 will be described below. In this integration processing, similarity levels for respective blocks are integrated so that the similarity level of a block which occupies a larger area in the reference destination image is reflected largely as that of the entire reference destination image.

For example, assume that similarity ratios n1 to n6 are respectively calculated for blocks B1 to B6 in the reference destination image. At this time, an integrated similarity ratio N of the entire reference destination image is given by:

$$N = w1 \times n1 + w2 \times n2 + w3 \times n3 + \ldots + w6 \times n6 \quad (1)$$

where w1 to w6 are weighting coefficients that evaluate the similarity ratios of the respective blocks. The weighting coefficients w1 to w6 are calculated based on an occupation ratio of each block in the reference destination image. For example, let S1 to S6 be the sizes of the blocks B1 to B6. Then, w1 can be calculated by:

$$w1 = S1/(S1 + S2 + \ldots + S6) \quad (2)$$

The size of each block can be obtained with reference to the block information. By the weighting processing using such occupation ratio, the similarity level of a block which occupies a larger area in the reference destination image can be largely reflected on that of the entire reference destination image.

Note that the method of calculating the integrated similarity level is not limited to such specific method.

<User Confirmation Mode>

The user may set the user confirmation mode in advance using the input unit 113 so that the user confirmation mode starts immediately after completion of the retrieval processing in step S3140, or the CPU may start the user confirmation mode in accordance with the retrieval results upon completion of the retrieval processing in step S3140.

The following processing may be executed to determine whether or not the user confirmation mode is started in accordance with the results of the retrieval processing in step S3140.

For example, when only one retrieval result is obtained in step S3140 (when the retrieval result per page is one image), or when the retrieval result with the highest similarity level and that with the next highest similarity level have a similarity level difference equal to or larger than a predetermined value, and the retrieval result with the highest similarity level is more likely to be a desired one, the user confirmation mode is skipped; otherwise, the user confirmation mode is started.

However, when the Nup-printed paper document is scanned, if at least one of the above conditions (when only one retrieval result is obtained in step S3140 (when the retrieval result per page is one image), or when the retrieval result with the highest similarity level and that with the next highest similarity level have a similarity level difference equal to or larger than a predetermined value, and the retrieval result with the highest similarity level is more likely to be a desired one) is not satisfied for each of candidates corresponding to respective pages in a scan image, the user confirmation mode is started, and only the page which does not satisfy the above condition is confirmed.

After the user confirmation mode is started, a user interface implemented by the display unit 116 and input unit 113 of the MFP 100 displays the retrieval results in step S3140 in the descending order of similarity level, and the user selects a desired image from these results. In step S3160, this user interface is displayed, and an operation to this user interface is accepted.

In this way, when the start of the user confirmation mode is automatically determined, the need for selection of an image by the user can be obviated, thus reducing the number of operation steps.

Figure 19:
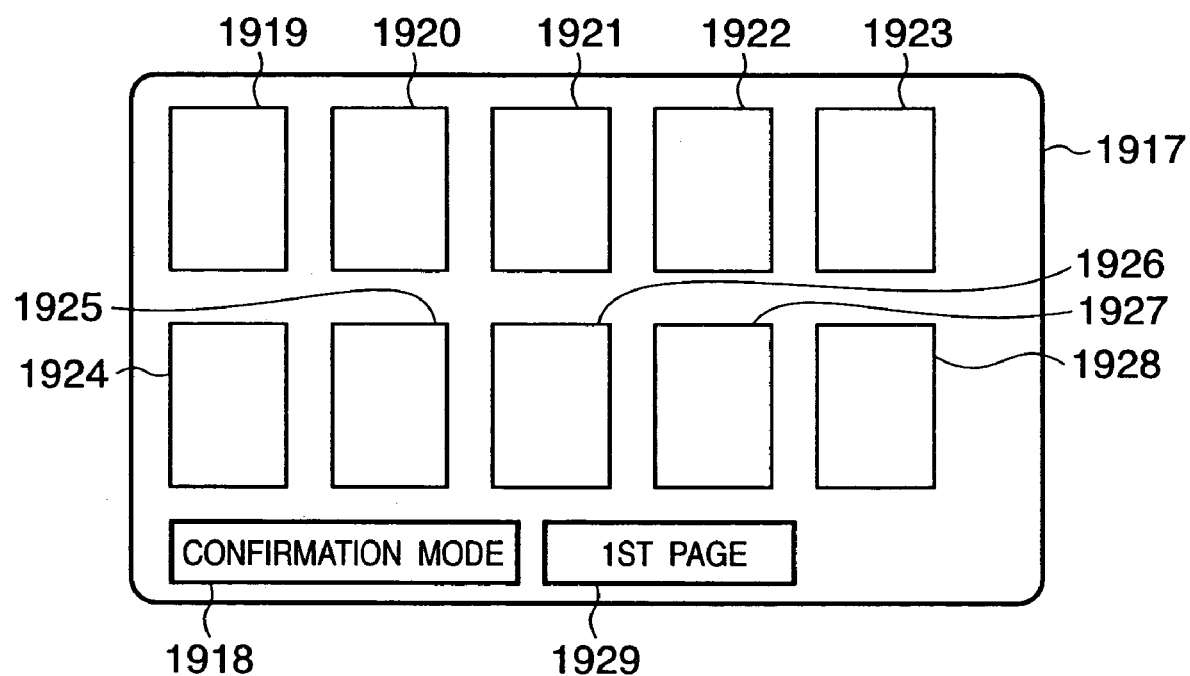
FIG. 19 shows a display example of a user interface which is displayed in a user confirmation mode, and is implemented by a display unit 116 and input unit 113 of the MFP 100.

The user interface implemented by the display unit 116 and input unit 113 will be described below. FIG. 19 shows a display example of this user interface.

Reference numeral 1917 denotes a user interface displayed on the display area 1417 shown in FIG. 14.

Reference numeral 1918 denotes a mode display field. In FIG. 19, the user confirmation mode is set. That is, it is set to start the user confirmation mode upon completion of the retrieval processing in step S3140. If the user designates a portion of the mode display field 1918 with his or her finger or the like, "non-user confirmation mode" is started, and a character string "non-user confirmation mode" is displayed on this mode display field 1918. In this manner, the "user confirmation mode" and "non-user confirmation mode" are alternately set every time the mode display field 1918 is designated.

Reference numerals 1919 to 1928 denote thumbnail images of images as a result of the retrieval processing in step S3140. These thumbnail images are displayed in turn from 1919 in numerical order and descending order of similarity level. In the example of FIG. 19, a maximum of 10 thumbnail images are displayed. If 10 or more retrieval results are obtained, top ten thumbnail images are displayed in descending order of similarity level.

Reference numeral 1929 denotes a field displayed when the query image is an image obtained by scanning the Nup-printed paper document. This field 1929 is displayed when the numerical value input to the field 1420 on the user interface exemplified in FIG. 14 is 2 or more.

In FIG. 19, since this field 1929 displays "1st page", the images 1919 to 1928 are those which have predetermined similarity levels or higher to the image of the first page in the query image and are ranked in the top ten of the images registered in the storage unit 111.

Every time the operator designates this field 1929, the display contents on the field 1929 change like "2nd page", "3rd page", ..., "N-th page" (N is the numeral value input to the field 1420 and is the number of pages included in the query image). Also, the images 1919 to 1928 are switched to like "images which have predetermined similarity levels or higher to the image of the second page in the query image and are ranked in the top ten of the images registered in the storage unit 111", "images which have predetermined similarity levels or higher to the image of the third page in the query image and are ranked in the top ten of the images registered in the storage unit 111", ..., "images which have predetermined similarity levels or higher to the image of the N-th page in the query image and are ranked in the top ten of the images registered in the storage unit 111".

The operator can designate one retrieval result for each page by designating one of the images 1919 to 1928 for each page. In FIG. 19, since the "images which have predetermined similarity levels or higher to the image of the first page in the query image and are ranked in the top ten of the images registered in the storage unit 111" are displayed as the images 1919 to 1928, the user designates one of the images 1919 to 1928.

<Details of Image Quality Comparison Processing>

Details of the image quality comparison processing in step S3161 will be described below. As described above, the image quality of the image of the page of interest of those in the query image is compared with that of the image (to be referred to as selected image hereinafter) selected in step S3160 or S3190 in correspondence with the image of the page of interest. In this case, the image quality comparison uses image quality information of the images to be compared.

When the image quality information includes a plurality of items, the respective items are checked, and items whose values are not "No Information" of the two images are selected and compared. The selected items are checked in the order of items which make larger contributions to the image quality. For example, upon comparing the image quality of the image of the page of interest in the query image with that of the selected image selected in step S3160 or S3190 in correspondence with the image of the page of interest, the image quality information for the query image and that for a document to which the selected image belongs are referred to.

When the page layout in the query image is 2in1 and its paper quality is high-quality paper, and the page layout of the document to which the selected image belongs is 1in1, and its paper quality is recycled paper, the query image has higher paper quality but its page layout is 2in1. Hence, the resolution per page of the query image is half that of the selected image. On the other hand, the high-quality paper has higher color reproducibility or the like than the recycled paper, but there is no large difference. In such case, the image quality difference determined by the resolution difference per page is overwhelmingly larger than that determined by the paper quality difference. Therefore, when the page layout and paper quality are the selected items, the page layouts are compared first, and if it is determined that the query image has higher image quality, paper quality comparison is skipped. If it is not determined as a result of page layout comparison that the query image has higher image quality, paper qualities are compared, and this comparison result is adopted. As described above, items are compared in the order from those which make larger contributions to the image quality, and the remaining items are compared as needed.

When the image quality information is expressed by levels, image quality with higher level is determined as higher image quality.

As described above, according to this embodiment, when the query image has higher image quality than that of the already registered image, these images are replaced to register the query image as a new original image, thus making the next retrieval processing with higher precision. Since various users execute retrieval processing, they often hold originals on hand, and the query image is more likely to have higher image quality. Hence, as more users use this image processing system, it can achieve retrieval processing with higher precision. Also, the print image quality can be improved.

In this embodiment, in order to improve the processing efficiency of the whole image processing system, the above processes are distributed to and executed by various terminals which form the image processing system, but they may be executed on a single terminal (e.g., MFP 100).

Second Embodiment

In the first embodiment, the user inputs the image quality information of an image obtained by scanning a paper document via the user interface. Alternatively, in this embodiment, the image quality of an image is obtained by analyzing the image.

<Registration Processing>

Figure 20A:
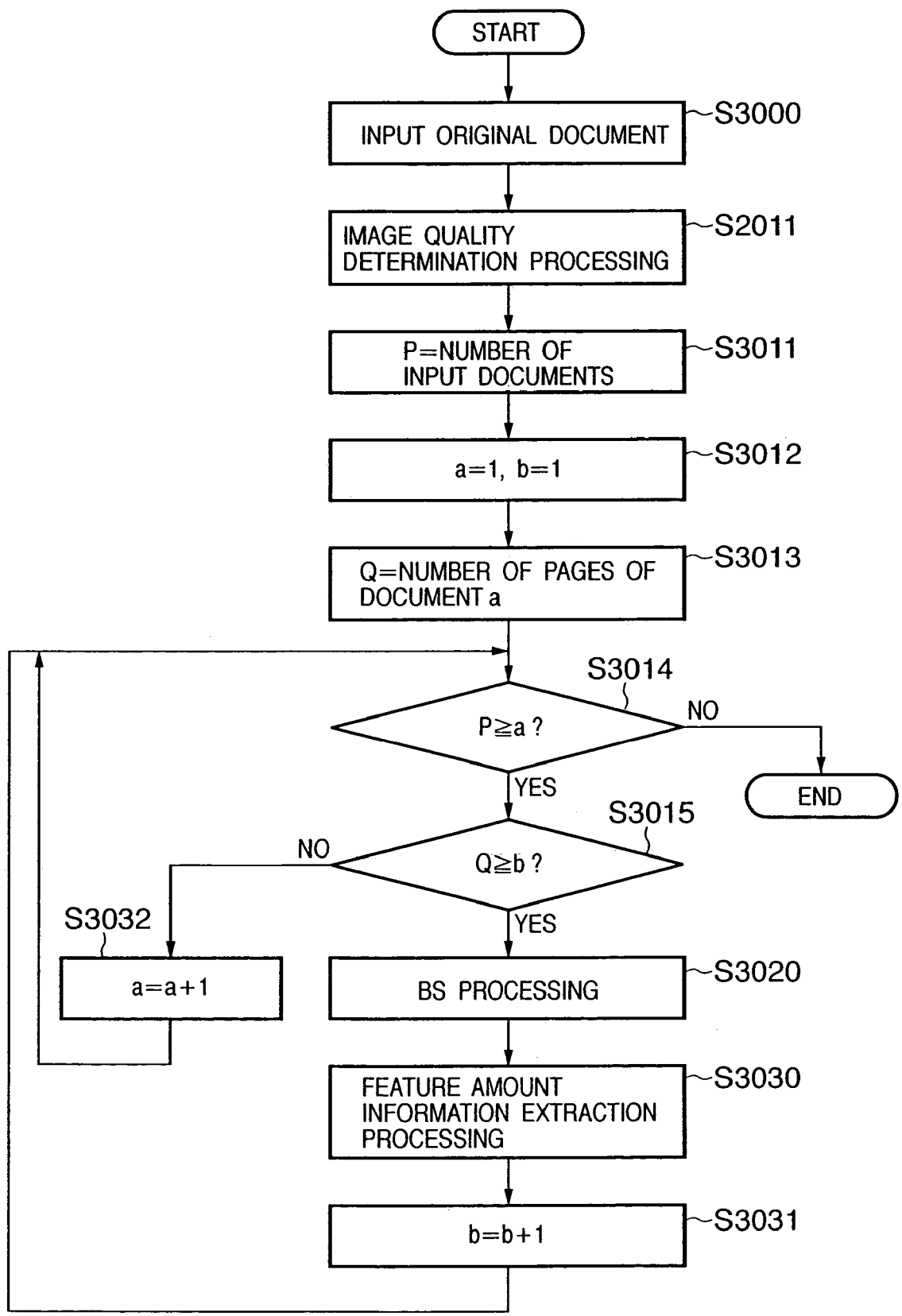
FIG. 20A is a flowchart showing a series of processes for scanning a paper document to read information printed on this paper document as image data, and registering the read image in the storage unit 111 of the MFP 100.

FIG. 20A is a flowchart showing a series of processes for scanning a paper document to read information printed on this paper document as image data, and registering the read image in the storage unit 111 of the MFP 100. Note that the same step numbers in FIG. 20A denote the same steps as those in FIG. 3A, and a description thereof will be omitted.

In step S2011, image quality is determined by analyzing the raster image input in step S3010 or acquiring sensor information upon inputting the paper document, thus obtaining image quality information. At this time, as the image quality information, various kinds of information themselves associated with the image quality may be used or the image quality information expressed by a level determined based on various kinds of information may be used as in the first embodiment. Details of the processing in this step will be described later.

<Retrieval Processing>

Figure 20B:
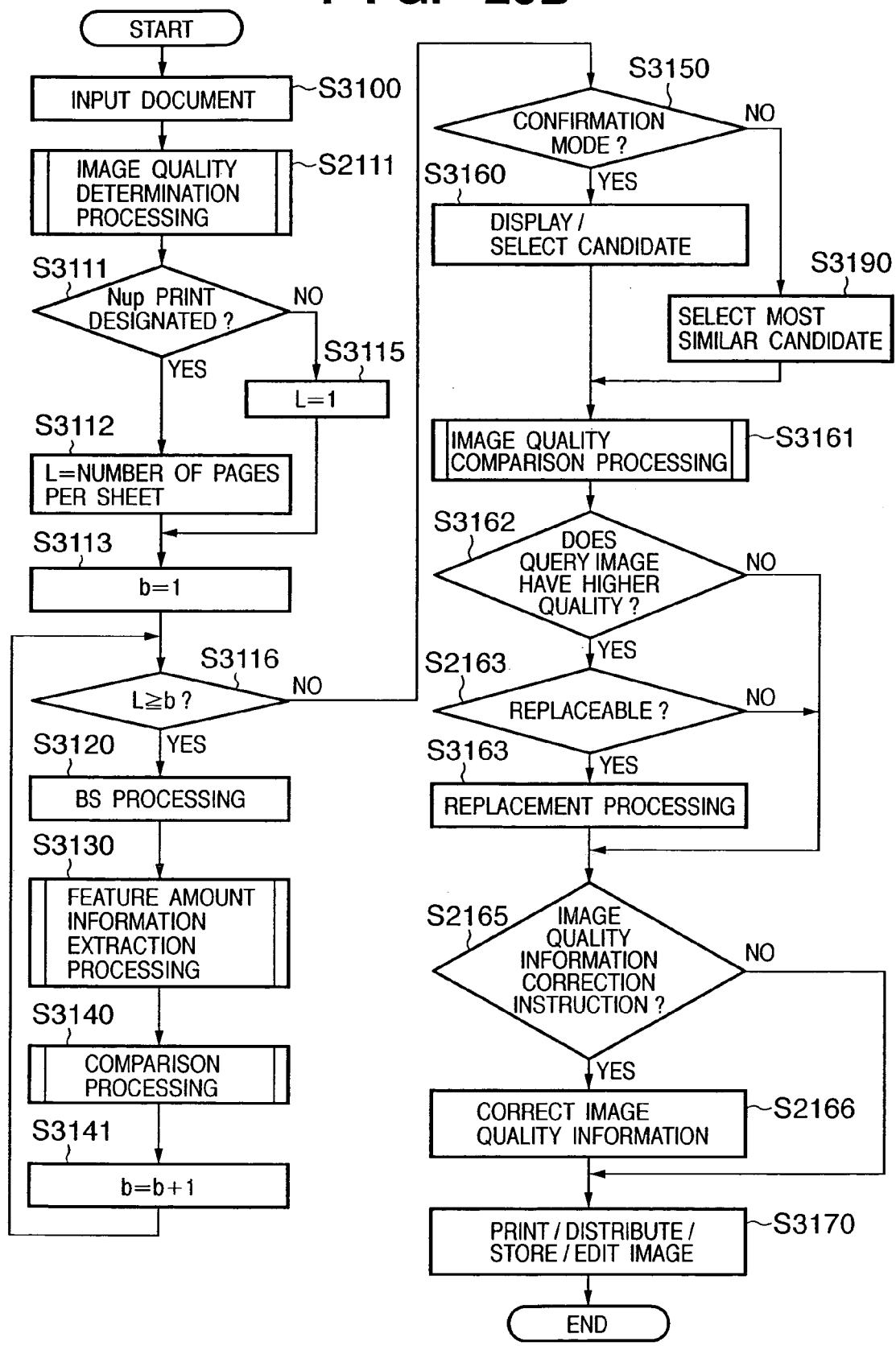
FIG. 20B is a flowchart of retrieval processing for retrieving desired one of digital data of original documents registered in the storage unit 111.

The retrieval processing for retrieving desired digital data of those of original documents registered in the storage unit 111, as described above, will be described below using FIG. 20B which shows the flowchart of that processing. Note that the same step numbers in FIG. 20B denote the same steps as those in FIG. 3B, and a description thereof will be omitted.

In step S2111, the same processing as in step S2011 is applied to the query image input in step S3110. Details of the processing in this step will be described later.

As a result of comparison between the image of the page of interest in the query image and the image selected in step S3160 or S3190 in correspondence with the image of the page of interest, if it is determined in step S3162 that the image of the page of interest has higher image quality, the flow advances to step S2163, and an instruction as to whether or not to execute the registration processing in step S3163 is accepted. This instruction is input by the operator. The reason why such instruction is accepted is to allow the operator to determine if the image quality determination result in step S2111 is correct. Details of the processing in this step will be described later.

In step S2165, an instruction as to whether or not to correct image quality information of the image to be registered is accepted. This instruction is input by the operator. If no such instruction is input, the flow advances to step S2166, and a user interface used to correct the image quality information is displayed on the display screen of the display unit 116 to accept corrections. Details of the processes in steps S2165 and S2166 will be described later.

<Details of Image Quality Determination Processing>

Details of the image quality determination processing in steps S2011 and S2111 will be described below. In the following description, the determination processes of Nup print determination, color/gray-scale print determination, paper size determination, and paper quality determination will be exemplified.

Nup Print Determination Processing

The Nup print determination processing for determining whether or not an image obtained as a scanning result of the image scanning unit 110 is Nup-printed will be explained below.

Figure 21:
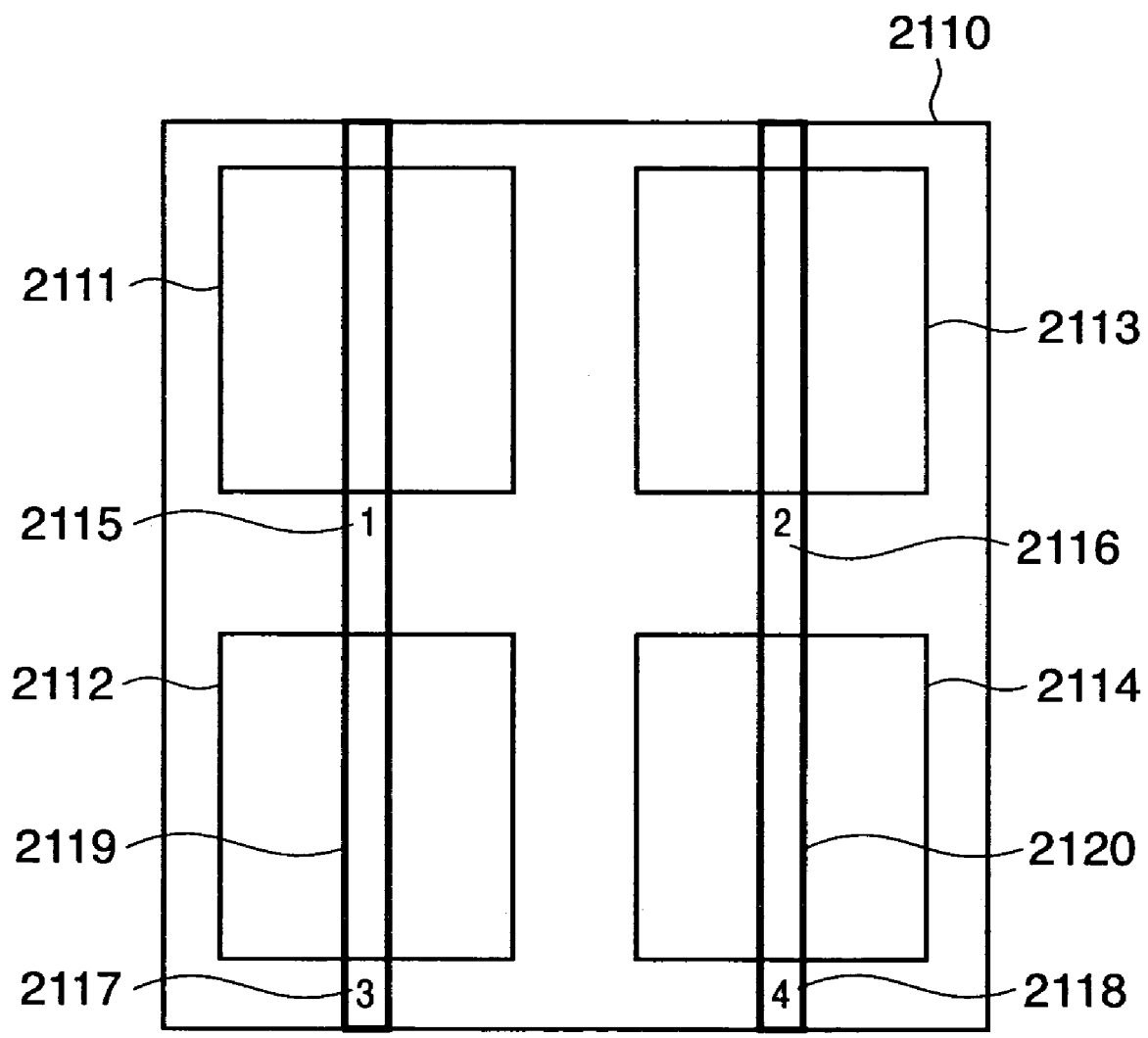
FIG. 21 shows an example of a paper document obtained by Nup-printing four pages per sheet.

In a normal print mode in which a document for one page is printed on a paper document, a page number is printed on the top or bottom end of the paper document. On the other hand, in the Nup print mode, a plurality of page numbers are printed at equal intervals in the paper document. By utilizing this fact, whether or not a scan image to be processed is Nup-printed is determined. Taking as an example a paper document which is obtained by Nup-printing four pages on one sheet, as shown in FIG. 21, the processing for determining whether or not this paper document is Nup-printed upon scanning this paper document will be explained below. FIG. 21 shows an example of a paper document obtained by Nup-printing four pages per sheet.

In FIG. 21, reference numeral 2110 denotes an entire region of a sheet upon Nup-printing. Reference numerals 2111 to 2114 denote page images of respective pages. Reference numerals 2115 to 2118 denote page numbers assigned to the respective pages. Bold frames 2119 and 2120 correspond to page number search regions to be described later.

Figure 22:
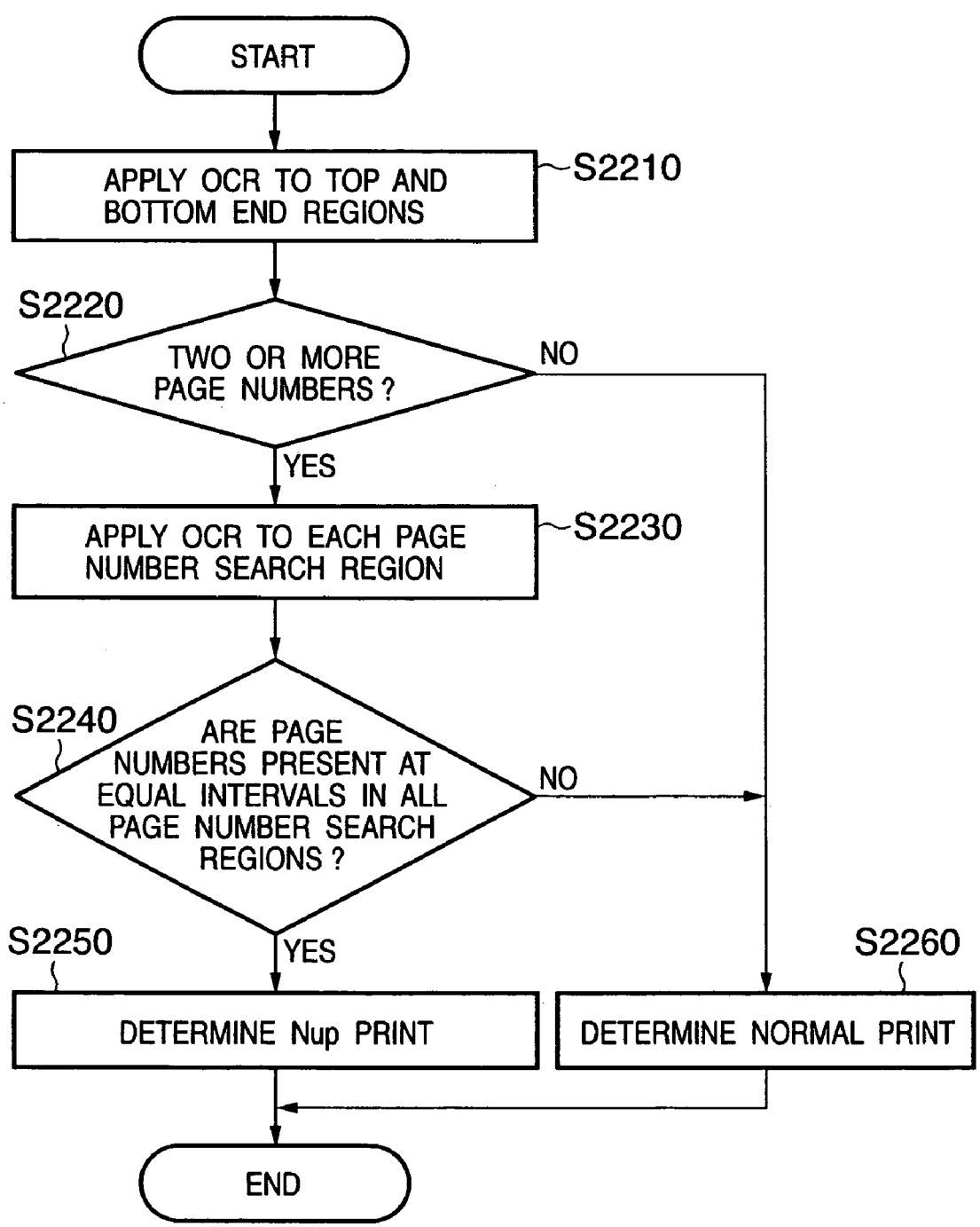
FIG. 22 is a flowchart showing details of Nup print determination processing according to the second embodiment of the present invention.

FIG. 22 is a flowchart showing details of the Nup print determination processing according to this embodiment.

In step S2210, the image scanning unit 110 applies OCR processing to the top and bottom end regions of the entire region 2110 of the sheet. It is checked in step S2220 if two or more page numbers (e.g., Arabic numerals or alphanumeric characters) are present at equal intervals in one of the top and bottom end regions as the processing result of the OCR processing. If two or more page numbers are not found (NO in step S2220), the flow jumps to step S2260 to determine that this paper document is obtained by printing one page on one sheet (normal print). On the other hand, if two or more page numbers are found (YES in step S2220), the flow advances to step S2230.

In the example of FIG. 21, the two page numbers 2117 ("3") and 2118 ("4") are detected from the bottom end region.

In step S2230, page number search regions used to search for other page numbers are set on the basis of the detected page numbers, and the OCR processing is applied to the set page number search regions.

In the example of FIG. 21, a rectangular region which includes the page number 2117 ("3") and is extended by the length of the sheet in a direction perpendicular to the array of the page numbers 2117 ("3") and 2118 ("4") (by the length of the sheet in this direction) is set as the page number search region 2119. Also, a rectangular region which includes the page number 2118 ("4") and is extended by the length of the sheet in a direction perpendicular to the array of the page numbers 2117 ("3") and 2118 ("4") (by the length of the sheet in this direction) is set as the page number search region 2120. Then, the OCR processing is applied to these page number search regions 2119 and 2120.

It is checked in step S2240 if page numbers are detected from the page number search regions, and the intervals between neighboring page numbers in the page number search regions are equal. If the intervals are not equal (NO in step S2240), the flow advances to step S2260 to determine the normal print mode. On the other hand, if the intervals are equal (YES in step S2240), the flow advances to step S2250 to determine the Nup print mode.

In the example of FIG. 21, the page numbers 2115 ("1") and 2117 ("3") are detected from the page number search region 2119, and the page numbers 2116 ("2") and 2118 ("4")

are detected from the page number search region 2120. Then, the page numbers in the page number search regions 2119 and 2120 have equal intervals. For this reason, the Nup print mode is determined.

In this case, the number of pages included in one sheet can be calculated by multiplying the number of page numbers detected in step S2210 and that detected in one page number search region in step S2230, and this number of pages is temporarily saved in the storage unit 111 as one piece of image quality information (page layout).

Determination Processing of Color or Gray-scale Print

The determination processing of color or gray-scale print will be described below.

In this determination processing, a ratio of color information that occupies an image obtained as a scanning result of the image scanning unit 110 is analyzed, and if the ratio of color information that occupies the image is equal to or higher than a predetermined threshold value, it is determined that the color information is sufficient; otherwise, it is determined that the color information is insufficient.

Figure 24:
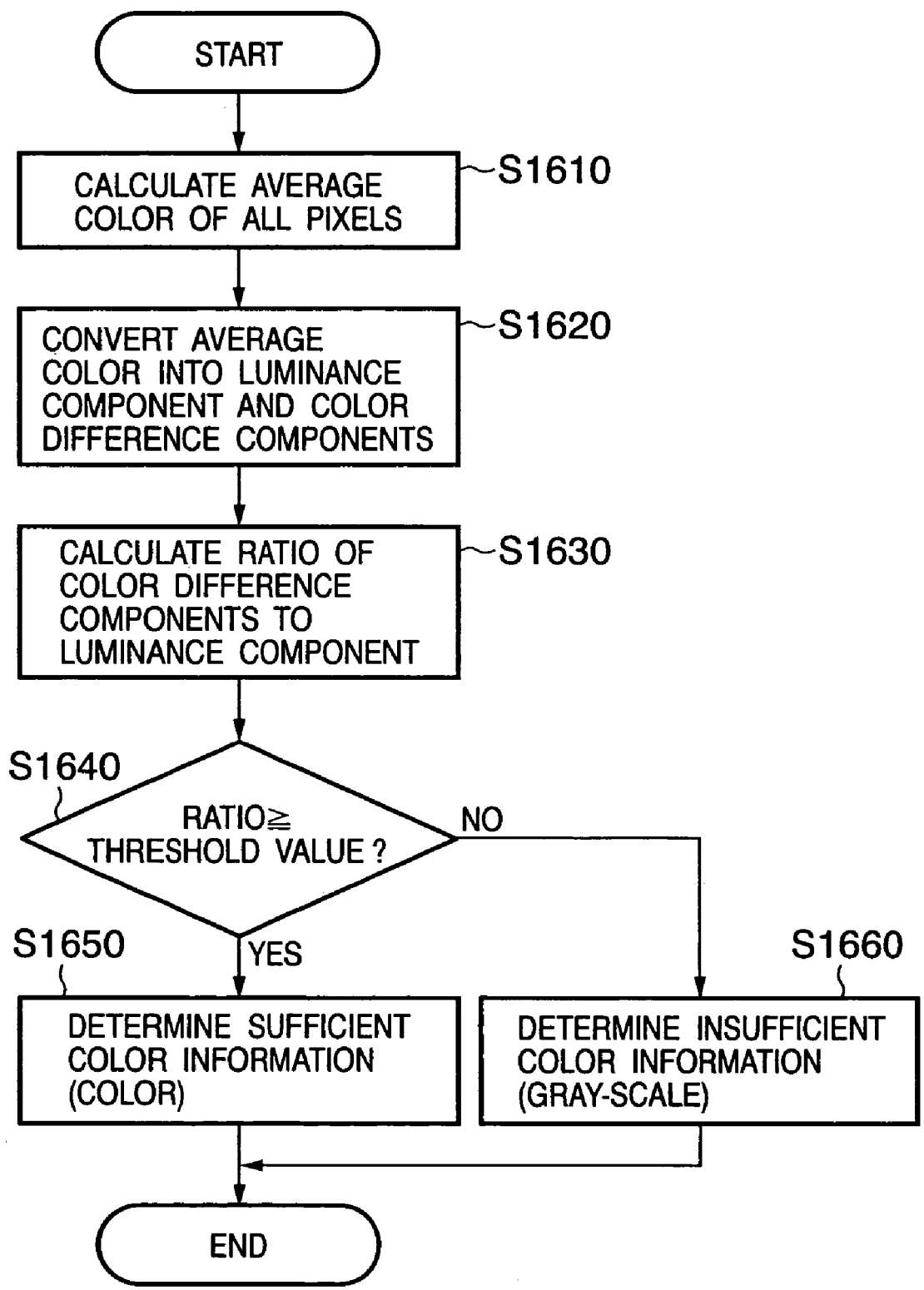
FIG. 24 is a flowchart of color/gray-scale print determination processing according to the second embodiment of the present invention.

FIG. 24 is a flowchart of the determination processing of color or gray-scale print according to this embodiment.

In step S1610, the average color of colors of all pixels which form the scan image is calculated. In step S1620, the average color is converted into a luminance component and color difference components. In step S1630, a ratio R of the color difference component values to the luminance component value is calculated.

As a separation method of separating a color into a luminance component and color difference components, the known method is used. For example, if a YCbCr color space is used, the relationships with 24-bit RGB values are expressed by:

$$Y = 0.29900 \times R + 0.58700 \times G + 0.11400 \times B$$

$$Cb = -0.16874 \times R - 0.33126 \times G + 0.50000 \times B + 128$$

$$Cr = 0.50000 \times R - 0.41869 \times G + (-0.08131) \times B + 128 \quad (3)$$

Then, the average color calculated in step S1610 is separated into a luminance component Yave and color difference components Cbave and Crave, and a ratio R is calculated by:

$$\text{Ratio } R = \sqrt{(Cbave \times Cbave + Crave \times Crave)} / Yave \quad (4)$$

It is checked in step S1640 if this ratio R is equal to or higher than a predetermined threshold value. If this ratio R is equal to or higher than the threshold value (YES in step S1640), the flow advances to step S1650 to determine that the color information of the image is sufficient (i.e., to determine the color image). On the other hand, if the ratio R is less than the threshold value (NO in step S1640), the flow advances to step S1660 to determine that the color information of the image is insufficient (i.e., to determine the monochrome image).

With the above processing, whether or not an image obtained by scanning a paper document is a color or gray-scale image can be determined.

Paper Size Determination Processing

The paper size determination processing will be described below. The paper size can be determined on the basis of the output from a photoelectric sensor by performing pre-scanning using the photoelectric sensor by the image scanning unit 110.

Paper Quality Determination Processing

The paper quality determination processing will be described below. As for the paper quality, the method of discriminating the type of paper using a reflection type sensor by utilizing the difference between the reflectances of light by high-quality paper and recycled paper is disclosed in Japanese Patent Laid-Open No. 4-39223, and the paper quality of a paper document can be determined by attaching such sensor to the image scanning unit 110.

When the image quality information is expressed by a level, after respective items of information described above are extracted, levels for respective items are calculated on the basis of references set in advance for these items, and a level which is most close to low image quality of those of all the items is adopted as the entire level.

<Details of Instruction Method as to Whether or not to Execute Registration Processing in Step S3163>

The instruction method as to whether or not to execute the registration processing in step S3163 will be described below.

In this embodiment, the observer does not perform any image quality determination for the query image. For this reason, for example, when the paper quality obtained by scanning the query image is erroneously determined due to sensor errors, or when the page layout is erroneously determined, the query image is likely to have higher image quality although the retrieved image has higher image quality in reality.

Hence, in this embodiment, the query image (input image) and retrieval result image (registered image) are displayed as a list on the display screen of the display unit 116, and two sets of image quality information of these images are also displayed as a list, so as to prompt the observer to determine the image qualities of these images, and to determine whether or not the input image is registered in place of the registered image. When the image quality information of the input image is erroneous, a format used to correct such errors is provided to the observer.

Figure 23:
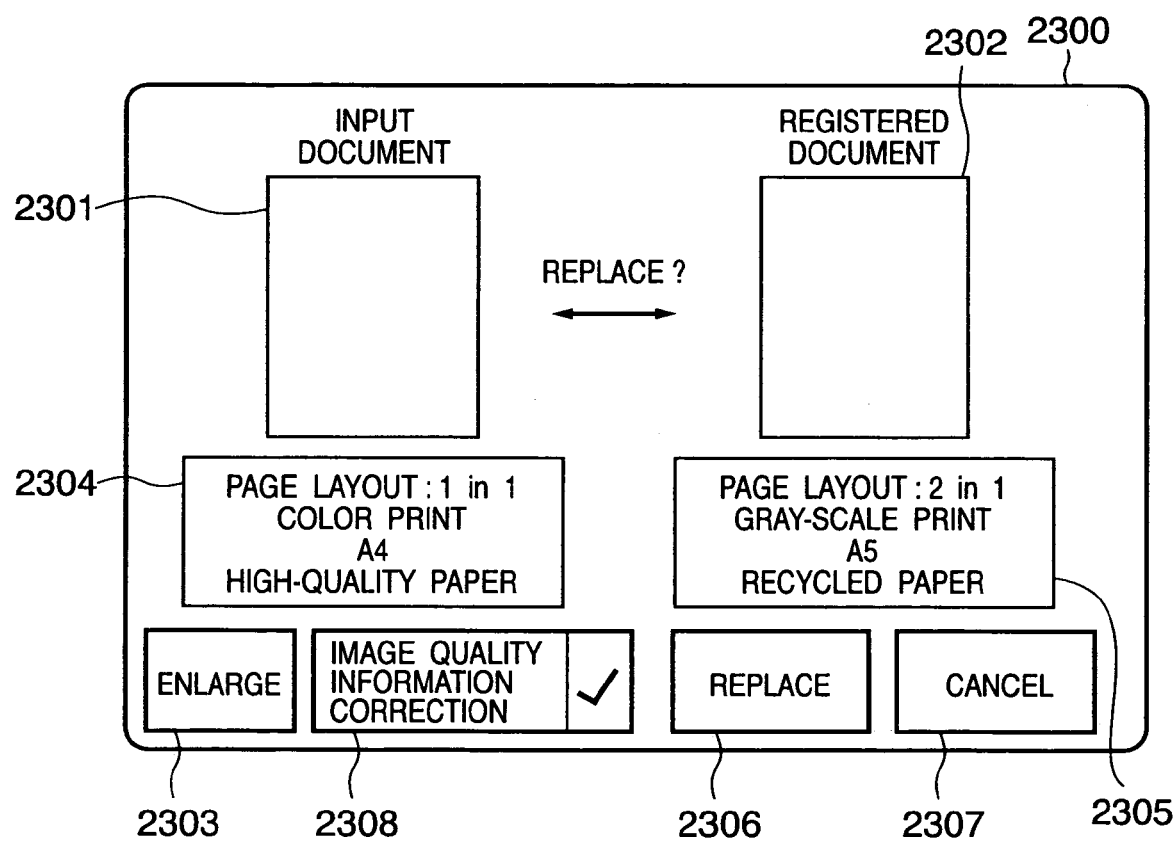
FIG. 23 shows a display example of a query image (input image), retrieval result image (registered image), and image quality information of each image on the display screen of the display unit 116.

FIG. 23 shows a display example of a query image (input image), retrieval result image (registered image), and image quality information of each image on the display screen of the display unit 116.

Reference numeral 2300 denotes a user interface displayed on the display area 1417 shown in FIG. 14.

Reference numeral 2301 denotes a thumbnail image of an input image (document); and 2302, that of a registered image (document). With these images, the user can compare the image qualities of the images. When the image quality is hard to be determined based on the thumbnail image, the user selects the display area of the thumbnail image to be determined, and clicks an enlarge button image 2303, thus displaying the selected thumbnail image in an enlarged scale.

By clicking the enlarge button image 2303 again, the image displayed in the enlarged scale can be returned to the thumbnail image.

Reference numeral 2304 denotes an image quality determination result for the input image; and 2305, image quality information of the registered document registered in the storage unit 111. When the user refers to these pieces of information, he or she can know the determination result based on which the image processing system of this embodiment recommends the user to register the input image in place of the registered image, and these pieces of information can be used as judgement information when the observer instructs to register the input image.

When the user determines that the input image is to be registered, he or she clicks a replace button image 2306 to issue a registration instruction to the CPU.

When the observer determines upon observing the image quality information 2304 that an image quality determination error has occurred, since it is undesirable to register the input image, he or she clicks a button image 2307 to cancel registration. In this way, registration can be canceled.

When the observer determines upon observing the image quality information 2304 that an image quality determination error has occurred, he or she can also correct the image quality information 2304. In this case, the observer clicks a field 2308. Upon clicking the field 2308, a check mark is displayed, as shown in FIG. 23. As a result, a user interface exemplified in FIG. 25 is displayed on the display screen of the display unit 116.

Figure 25:
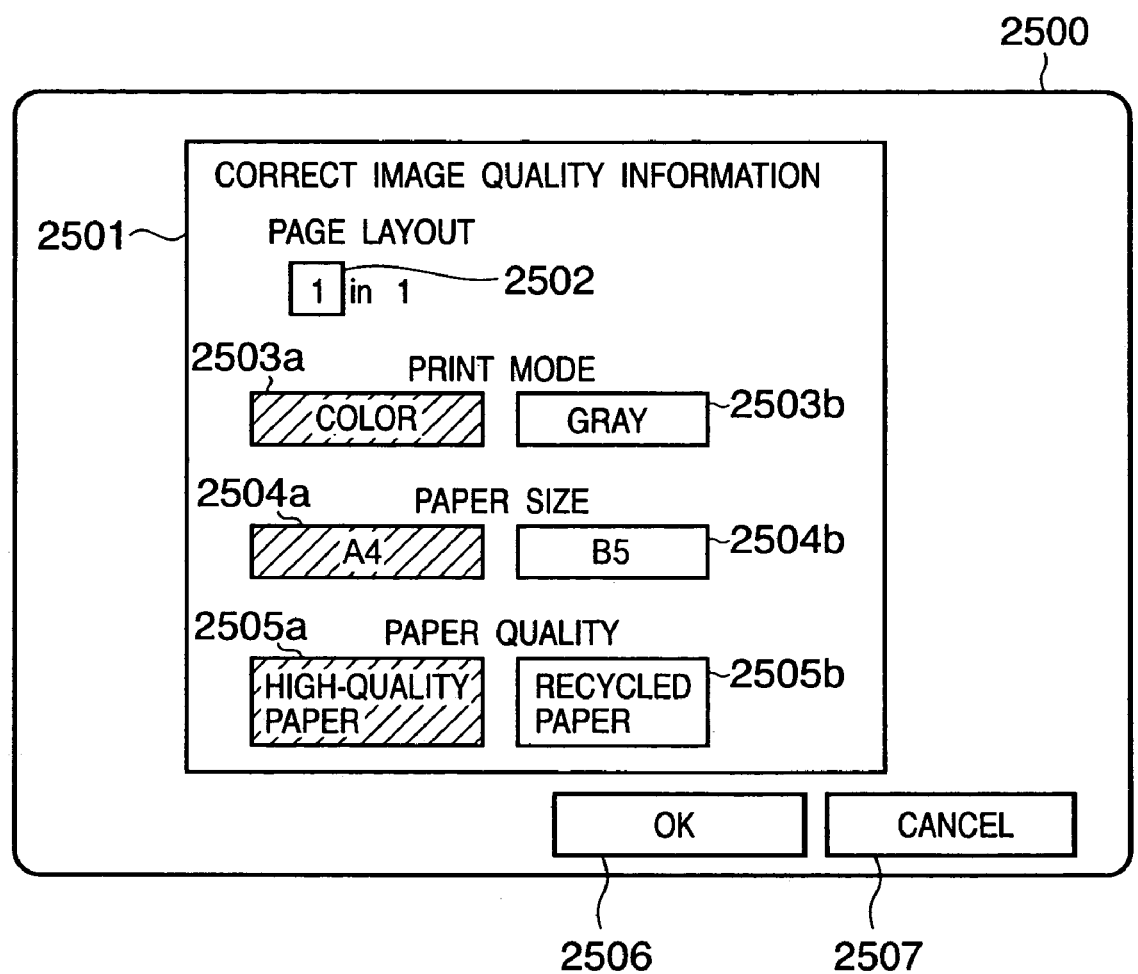
FIG. 25 shows a display example of a user interface used to correct image quality information of an input image.

FIG. 25 shows a display example of the user interface used to correct the image quality information of the input image.

Reference numeral 2500 denotes a user interface displayed on the display area 1417 shown in FIG. 14.

Reference numeral 2501 denotes image quality information as the result of the image quality determination processing for the input image. Items 2502, 2503a, 2503b, 2504a, 2504b, 2505a, and 2505b are the same as the items 1420, 1421a, 1421b, 1422a, 1422b, 1423a, and 1423b in FIG. 14, and these items can be set using the numeric keypad 1425 or by directly designating the displayed item, as has been described in the first embodiment. That is, the image quality information of the input image is corrected in the same manner as in a case wherein the observer inputs image quality information in the first embodiment.

Upon completion of correction, the observer can set the respective items set on this user interface as the image quality information for this input image and can register them in the storage unit 111 by clicking an OK button image 2506. Reference numeral 2507 denotes a cancel button image, which is clicked when correction itself of the image quality information is to be canceled.

By providing such user interface, the user can determine whether or not to register the input image, while confirming the thumbnail images of the input image and registered image, and their image quality information, and can instruct to register the input image. When the image quality information of the registered image or the input image to be registered is erroneously determined, it can be corrected as needed. If the image quality information is corrected, image quality comparison can be appropriately determined from the next time.

As described above, according to this embodiment, in addition to the effects described in the first embodiment, since image quality information of an input image upon registration/retrieval is automatically determined, the input image can be registered without troubling the user when it has higher image quality. Also, the user can confirm the determination result as to whether or not to register the input image as needed.

In the first and second embodiments, image quality information is assigned for each page. However, when each image has the same conditions, image quality information may be assigned for each image. At this time, the page number of the image management information can be omitted. When one image includes a plurality of pages, an image data group (page image group) obtained from that paper document is managed as a single file.

Note that the image quality information is designated by the user in the first embodiment and is automatically determined in the second embodiment. However, these embodiments may be combined. For example, automatic determination may be made upon registration to reduce a load on the user, and the image quality information may be designated by the user only upon retrieval. At this time, the user may confirm registered information, and when the registered image quality information includes errors, he or she may correct them. As another example, some modes may be set, and if paper documents to be scanned have nearly constant image qualities, the image qualities may be determined in an automatic determination mode; if they have larger variations of image qualities, the image qualities may be determined in a user designation mode in which the user designates the image quality information.

In the first and second embodiments, the scan resolution is fixed but may be changed. At this time, since the scan resolution is the resolution itself of the scan image quality, it can be used as image quality information.

In the first and second embodiments, paper documents are adopted as objects to be registered, but digital data may be adopted as objects to be registered. The file format at that time includes those (*.doc and *.pdf) which are created by an application used to create the digital data (e.g., MS-Word available from Microsoft® Corporation, Acrobat available from Adobe Systems® Corporation or the like). At this time, the digital data may be temporarily converted into a raster image, or character codes and images may be extracted and compared directly from the digital data without any BS processing.

In this way, since character codes free from any recognition errors can be obtained as text feature amounts, and image feature amounts can be extracted from an image with a high resolution, a higher retrieval precision can be obtained.

Furthermore, higher image quality can be obtained upon directly printing based on digital data. Hence, when the digital data are adopted as objects to be registered, information indicating whether a registered image is based on digital data or is obtained by scanning a paper document can be used as image quality information.

In the color feature amount extraction processing shown in FIG. 10, the highest-frequency color of an image to be processed is extracted as color feature information. However, the present invention is not limited to such specific processing. For example, an average color may be extracted as color feature information.

A color feature amount is used as the image feature amount. However, the present invention is not limited to such specific feature amount. For example, one or an arbitrary combination of a plurality of image feature amounts such as a luminance feature amount such as a highest-frequency luminance, average luminance, or the like, a texture feature amount expressed by a cooccurrence matrix, contrast, entropy, Gabor transformation, or the like, a shape feature amount such as an edge, Fourier descriptor, or the like, and so forth may be used.

The block selection processing is executed to segment an image to be processed into text and image blocks, and the retrieval processing is executed using multiple feature amounts of these blocks. Alternatively, the retrieval processing may be executed using the entire scan image as a unit. Also, the retrieval processing may be executed using only image blocks if the precision falls within an allowable range.

Character codes are adopted as text feature amounts. However, for example, matching with a word dictionary may be made in advance to extract parts of speech of words, and words as nouns may be used as text feature amounts.

In the first and second embodiments, the image quality information is registered in the storage unit 111. However, when the CPU has sufficiently high processing speed, the image qualities of the input image and registered image may be obtained upon registration/retrieval of an image, and may be compared. A method of obtaining image quality is not particularly limited. As is well known, image quality may be obtained on the basis of high frequency components in an image. With this arrangement, the data amount to be registered in the storage unit 111 can be reduced.

Other Embodiments

The present invention can be practiced in the forms of a system, apparatus, method, program, storage medium, and the like. Also, the present invention can be applied to either a system constituted by a plurality of devices, or an apparatus consisting of a single equipment.

Note that the present invention includes a case wherein the invention is achieved by directly or remotely supplying a program of software that implements the functions of the aforementioned embodiments (programs corresponding to the flowcharts shown in the above drawings in the embodiments) to a system or apparatus, and reading out and executing the supplied program code by a computer of that system or apparatus.

Therefore, the program code itself installed in a computer to implement the functional process of the present invention using the computer implements the present invention. That is, the present invention includes the computer program itself for implementing the functional processes of the present invention.

In this case, the form of program is not particularly limited, and an object code, a program to be executed by an interpreter, script data to be supplied to an OS, and the like may be used as long as they have the program function.

As a recording medium for supplying the program, for example, a flexible disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed on the basis of instructions of the program by a CPU or the like arranged in a function extension board or a function extension unit, which is inserted in or connected to the computer, after the program read out from the recording medium is written in a memory of the extension board or unit.

Throughout the aforementioned embodiments, according to the present invention, in a system that retrieves corresponding original digital data from a scanned document, the original digital data can be updated to that with higher quality, thus allowing high-quality applications such as print processing with high image quality and the like. Since feature amounts can be updated to those which are extracted from high-quality digital data, the retrieval precision can be improved.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-267518 filed on Sep. 14, 2004, which is hereby incorporated by reference herein.

What is claimed is:

1. An image processing apparatus for managing image data stored in a database, comprising:
    an input unit configured to input image data provided by reading a sheet;
    a count unit configured to count, from the input image data, a number of pages printed on the sheet;
    an extraction unit configured to extract, as page images, areas of the pages from the input image data;
    a registration unit configured to register, in the database, the extracted page images in association with the counted number of the pages;
    a retrieval unit configured to retrieve from the data base a page image similar to a query page image, from wherein the query page image is extracted by said extraction unit from query image data inputted by said input unit;
    a comparison unit configured to compare the number of pages stored in the database in association with the retrieved page image, and the number of pages counted by said count unit from the input query image data; and
    a storage control unit configured to store the query page image instead of the retrieved page image into the database, when the number of pages which is counted by said count unit from the input query image data is smaller than the number of pages stored in the database in association with the retrieved page image.

2. The apparatus according to claim 1, further comprising:
    a list display unit configured to display, when the number of pages which is counted by said count unit from the input query image data is smaller than the number of pages stored in the database in association with the retrieved page image, the retrieved page image data input by said input means and the information associated with the image quality of that image, and to display the retrieved image data and the information associated with the image quality of that image in a list; and
    correction means for correcting one of the information associated with the image quality of the image data input by said input means, and the information associated with the image quality of the retrieved image data.

3. The apparatus according to claim 1, wherein the retrieved page image is most similar to the query page image.

4. The apparatus according to claim 1, further comprising a selection unit configured to make, if said retrieval unit retrieves a plurality of page images, a user select one page image from retrieved page images.

5. The apparatus according to claim 1, further comprising a command input unit configured to input a command by a user, wherein said storage control unit stores the query page image in the database in response to the command from said command input unit.

6. An image processing method to be executed by an image processing apparatus which has a memory for holding image data, comprising:

an input step of inputting image data provided by reading a sheet;

a count step to count, from the input image data, a number of pages printed on the sheet;

an extraction step to extract, as page images, areas of the pages from the input image data;

a registration step to register, in the database, the extracted page images in association with the counted number of pages;

a retrieval step of retrieving a page image similar to a query page image, wherein the query page image is extracted by said extraction step from query image data inputted by said input step;

a comparison step of comparing the number of pages stored in the database in association with the retrieved page image, and the number of pages counted by said count step for the input query data; and a storage control step of storing, the query page image instead of the retrieved page image into the database, when the number of pages counted by said count unit from the input query image data is smaller than the number of pages stored in the database in association with the retrieved page image.

7. A computer-readable memory storing a program for making a computer implement an image processing method of claim 6.

* * * * *